United States Patent
Yagi et al.

(10) Patent No.: US 7,090,388 B2
(45) Date of Patent: Aug. 15, 2006

(54) LIGHT GUIDE, LIGHT SOURCE DEVICE, DISPLAY DEVICE AND INFORMATION TERMINAL EQUIPPED THEREWITH

(75) Inventors: Yoshie Yagi, Tokyo (JP); Masao Imai, Tokyo (JP); Goro Saito, Tokyo (JP); Koji Mimura, Tokyo (JP)

(73) Assignee: NEC Corporation, Tokyo (JP)

( * ) Notice: Subject to any disclaimer, the term of this patent is extended or adjusted under 35 U.S.C. 154(b) by 164 days.

(21) Appl. No.: 10/848,380

(22) Filed: May 19, 2004

(65) Prior Publication Data
US 2004/0234229 A1 Nov. 25, 2004

(30) Foreign Application Priority Data
May 20, 2003 (JP) ............................. 2003-142548

(51) Int. Cl.
*F21V 7/04* (2006.01)
(52) U.S. Cl. .................. 362/625; 362/626; 362/560
(58) Field of Classification Search ............... 362/26, 362/27, 146, 559–561, 600, 608–610, 615, 362/623–626, 628; 385/50, 146
See application file for complete search history.

(56) References Cited

U.S. PATENT DOCUMENTS 6,749,311 B1* 6/2004 Suzuki et al. ............... 362/610
6,871,976 B1* 3/2005 Niida et al. ................. 362/603

FOREIGN PATENT DOCUMENTS

| CN | 1441297 A | 9/2003 |
|---|---|---|
| JP | 2001-243822 A | 9/2001 |
| JP | 2001-332112 A | 11/2001 |
| JP | 2002-040420 A | 2/2002 |
| JP | 2002-109930 A | 4/2002 |
| JP | 2002-365439 A | 12/2002 |

* cited by examiner

*Primary Examiner*—Ali Alavi
*Assistant Examiner*—Bao Truong
(74) *Attorney, Agent, or Firm*—Sughrue Mion, PLLC

(57) ABSTRACT

A light source device which is uniform in the intensity of distribution of an emitted light and high in the optical utilization efficiency, a display device which is high in recognability and is energy-saving, and an information terminal are provided. A reflecting portion is formed on a surface opposed to an emitting surface of a linear light guide. The reflecting portion is periodically formed with a total reflecting surface guiding a light incident on a linear light guide from a point light source, a light extracting surface allowing the light to reflect in such a way as to emit the light guiding the linear light guide from the emitting surface, and a re-incidence plane which takes the light transmitted but not reflected on the light extracting surface into the linear light guide again. By changing the size of the light extracting surface and the re-incidence plane, the intensity of distribution of the emitting light from the linear light guide can be made uniform.

11 Claims, 15 Drawing Sheets

11

21

TOP VIEW

FRONT VIEW

TOP VIEW

FRONT VIEW

LIGHT SOURCE

WEDGE - SHAPED REFLECTING GROOVE

LIGHT SOURCE

LIGHT GUIDE, LIGHT SOURCE DEVICE, DISPLAY DEVICE AND INFORMATION TERMINAL EQUIPPED THEREWITH

BACKGROUND OF THE INVENTION

1. Field of the Invention

The present invention relates to a light guide, a light source device equipped with the light guide and a display device using this device and an information terminal, and more in particular, it relates to a light source device having a light guide which is uniform in the intensity of distribution of an emitting light and high in emitting efficiency, and a display device which is high in cognizability and is in need of little electric power consumption and an information terminal equipped therewith.

2. Description of the Prior Art

Among the display devices, a liquid crystal display (LCD) is characterized by being light in weight and thin in size. Consequently, the LCD has been widely used as the display device for use of information processing terminals of a laptop type, a note type and the like or as the display device of various information terminals such as mobile electronic equipment including a portable type television, an electronic notebook, a portable telephone and the like. In general, in the LCD, the cognizability of information is enhanced by illuminating a display panel by a light source device.

As one of the light source devices used in the LCD, there is available an edge light type light source device, in which a light from the light source is allowed to enter from a side surface of a sheet-shaped light guide which becomes an emitting surface. Since the edge light type light source device is placed at the side surface of an almost bar-shaped light guide, the thickness of the whole light source device can be made nearly equal to the light guide. Consequently, it is possible for the edge light type light source device to be made thinner compared to a vertical type light source device having a light source placed in the front surface of the sheet-shaped light guide. Thus, in the LCD, use of the edge light type light source device has been prevailing.

As for the light source adopted for the edge light type light source device, there is available a point light source such as a light emitting diode (LED) and the like or a line light source such as a cold cathode fluorescent lamp (CCFL).

In FIG. 12 is shown a constitution of the light source device, in which a light from the point light source is turned into a line light source (turned into a linear light flux), and after that, it is allowed to enter the sheet-shaped light guide. The light source device 101 is constituted by the point light sources 102a, 102b, a linear light guide 103, and the sheet-shaped light guide 104. In a direction to which the point light sources 102a and 102b emit a light, there is provided the linear light guide 103, and in a direction to which the linear light guide 103 emits a light, there is provided the sheet-shaped light guide 104.

In the linear light guide 103, there is formed a reflecting portion 105 provided with a periodic concave-convex structure or a light scattering portion on a surface opposed to an emitting surface 103c. Further, in a sheet-shaped light guide 104, there is formed a reflecting portion 106 comprising the periodic concave-convex structure or the light scattering portion on the surface opposed to an emitting surface 104c.

The light which emits from the point light sources 102a and 102b and enters inside the linear light guide 103 from incidence planes 103a and 103b is reflected on a reflecting portion 105, so that it is turned into a line light source and is emitted outside of the linear light guide 103 from the emitting surface 103c. The light which emits from the linear light guide 103 and enters inside the sheet-shaped light guide 104 from an incidence plane 104a is reflected on a reflecting portion 106, so that it is turned into a sheet light source (turned into a sheet-shaped light flux) with its angle changed and is emitted outside of the sheet-shaped light guide 104 from an emitting surface 104c.

Although not shown in the drawing, the display device is disposed in such a way as to oppose to the emitting surface 104c of the sheet-shaped light guide 104. Incidentally, the light source device 101 is used as a back light in case of illuminating a transmission type display device, and as a front light in case of illuminating a reflection type display device. FIG. 12 shows a constitution adopting the light source device 101 as a front light.

Further, in FIG. 13 is shown a constitution of the light source device of a type which allows the light emitted by the line light source (such as CCFL and the like) to directly enter the sheet-shaped light guide. The light source device 101 is constituted by line light sources 108a and 108b, a sheet-shaped light guide 104, and reflectors 109a and 109b. Line light sources 108a and 108b are disposed by opposing to incidence planes 104a and 104b of the sheet-shaped light guide 104. The incidence planes 104a and 104b are covered by the reflectors 109a and 109b together with the line light sources 108a and 108b.

Incidentally, in the sheet-shaped light guide 104, there is formed a reflecting portion 106 comprising the periodic concave-convex structure or the light scattering portion on the surface opposed to the emitting surface 104c.

The light emitted from the line light sources 108a and 108b is reflected directly or in the reflectors 109a and 109b, and after that, it enters the sheet-shaped light guide 104 and is reflected in the reflecting portion 106, so that it is turned into a sheet light source.

Although not shown in the drawing, the display device is disposed in such a way as to oppose to the emitting surface 104c of the sheet-shaped light guide 104. Incidentally, FIG. 13 shows a constitution adopting the light source device 101 as a back light.

In recent years, demands for the enhancement of cognizability and reduction in electric power consumption for the LCD have been increased.

In the above-described edge light type light source device, the light entering the linear light guide or the sheet-shaped light guide from the light source repeats a reflection inside the light guide during the course of turning into a line light source or a sheet light source. At this time, the light is not only absorbed in the light guide and the light scattering portion, but the part thereof returns to the light source and the reflector so as to be absorbed there, and this causes an optical loss to reduce the emitting efficiency of the light guide. As a result, there is a problem in that the optical utilization efficiency of the light source device is lowered. Incidentally, what is meant by "the emitting efficiency of the light guide" is a ratio of the light which emits outside of the light guide from the emitting surface, to the light incident on the light guide from the incidence plane. Further, what is meant by "the optical utilization efficiency of the light source device" is a ratio of the light which illuminates the display device, to the light which is emitted from the light source.

To solve this problem, there is disclosed a method for enhancing the optical utilization efficiency of the light source device by modifying a shape of the linear light guide in Japanese Patent Laid-Open No. 2002-365439.

In FIG. 14 is shown a constitution of the invention disclosed in this publication. The light source device 101 is constituted by the point light sources 102a and 102b, the linear light guide 103, and the sheet light source 104. FIG. 14A is a top view and a front view schematically representing the light source device 101, and FIG. 14B is an enlarged view of the reflecting portion 105 of the linear light guide 103.

As shown in FIG. 14A, in a direction to which the light emits from the point light sources 102a and 102b, there is disposed the linear light guide 103, and in a direction to which the light emits from the linear light guide 103, there is disposed the sheet-shaped light guide 104.

The linear light guide 103, as shown in FIG. 14A, is narrowest in its width at the center, and is formed so as to become wide toward both end portions. In the linear light guide 103, there is formed the reflecting portion 105 on the surface opposed to the emitting surface 103c.

The reflecting portion 105, as shown in FIG. 14B, is constituted by a total reflecting surface 105a, which guides the light incident on the linear light guide 103 from the point light sources 102a and 102b (in other words, guides the light without causing an optical loss) and a light extracting surface 105b, which reflects the light advancing inside the linear light guide 103 in such a way that it emits from the emitting surface 103c. The light extracting surface 105b forms an almost V-shaped groove, and allows the light incident from both of the point light sources 102a and 102b to reflect. The total reflecting surface 105a and the light extracting surface 105b are formed in such a way as to gradually draw to the emitting surface 103c as it draws to the center from the end of the linear light guide 103. The linear light guide 103 is narrowest in its width at the center of the emitting surface 103c, and is formed in such a way as to become wide toward both end portions.

In the sheet-shaped light guide 104, there is provided the reflecting portion 106 comprising the periodic concave-convex portion or the light scattering portion on a surface opposed to the emitting surface 104c.

The light incident on the linear light guide 103 from the point light sources 102a and 102b is reflected on the reflecting portion 105, and after being turned into a line light source, it emits from the linear light guide 103, and enters the sheet-shaped light guide 104 from the incidence plane 104a of the sheet-shaped light guide 104. The light incident on the sheet-shaped light guide 104 is reflected on the reflecting portion 106 so as to be turned into a sheet light source, and emits from the emitting surface 104c.

As described above, the linear light guide 103 is narrowest in its width at the center and is wide toward both end portions. Consequently, the majority of the light incident on the linear light guide 103 from the point light sources 102a and 102b emits outside of the linear light guide 103 before reaching the center in which the width of the linear light guide 103 becomes narrowest, and this causes the number of reflection times to be reduced at the linear light guide 103. As a result, the optical loss at the linear light guide 103 is lowered, thereby enhancing the optical utilization efficiency of the light source device 101.

As for another method, there is a method disclosed in Japanese Patent Laid-Open No. 2001-243822, in which a shape of the reflecting portion of the sheet-shaped light guide is improved so as to enhance emitting efficiency of the sheet-shaped light guide.

In FIG. 15 is shown a constitution of the light source device of this publication. The light source device 101 is constituted by the point light source 102, the linear light guide 103, and the sheet-shaped light guide 104. FIG. 15A is a schematic top view and a schematic front view of the light source device 101, and FIG. 15B is an enlarged view of the reflecting portion 106 of the sheet-shaped light guide 104.

As shown in FIG. 15A, in a direction to which the light emits from the point light source 102, there is disposed the linear light guide 103, and in a direction to which the light emits from the linear light guide 103, there is disposed the sheet-shaped light guide 104.

Here, the linear light guide 103 is wedge-shaped. Further, in the sheet-shaped light guide 104, there is formed the reflecting portion 106 on the surface opposed to the emitting surface 104c. The reflecting portion 106, as shown in FIG. 15B, is constituted by the total reflecting surface 106a which guides the light incident on the sheet-shaped light guide 104, the light reflecting surface 106b which allows the light (advancing inside the light guide without causing a loss) which is guided inside the sheet-shaped light guide 104 to reflect in such a way as to emit from the emitting surface 104c, and a re-incidence plane 106c which takes the light transmitting the light extracting surface 106b into the sheet-shaped light guide 104 again. A tilt angle p of the light extracting surface 106b and a tilt angle q of the re-incidence plane 106c are in the relationship of p<q, p=45 to 65°, and q=80 to 90°.

The light emitted from the point light source 102 and incident on the linear light guide 103 is incident on the sheet-shaped light guide 104 after it is turned into a line light source by the linear light guide 103, and it is reflected on the reflecting portion 106, so that it is turned into a sheet light source.

In the light source device 101, a part of the light transmitted outside of the sheet-shaped light guide 104 from the light extracting surface 106b is incident again inside the sheet-shaped light guide 104 from the re-incidence plane 106c immediately after transmitting, and emits from the emitting surface 104 after it is reflected on the adjacent light extracting surface 106b. As a result, a number of reflection times at the sheet-shaped light guide 104 is reduced, and the optical loss at the sheet-shaped light guide 104 is lowered, thereby enhancing the optical utilization efficiency of the light source device 101.

Although the light source device 101 shown in FIG. 14 attempts to enhance the emitting efficiency by reducing the number of reflection times in the linear light guide 103, the intensity distribution of an emitted light from the linear light guide 103 is not made uniform because the number of reflection times is reduced. That is, as shown in FIG. 16A, the emitted light from the linear light guide 103 shows the intensity distribution in which it is strong in the vicinity of both end portions (incidence planes 103a and 103b) of the linear light guide 103 and becomes weak as it draws to the center portion. As a result, the uniformity of the intensity distribution of the emitted light from the light source device 101 becomes low, and the cognizability of the display device using the light source device 101 is also lowered.

Further, the same is applicable to the light source device 101 shown in FIG. 15. As shown in FIG. 16B, the emitted light from the sheet-shaped light guide 104 shows the intensity distribution in which it is strong in the vicinity of the end portion (incidence plane 104a) of the sheet-shaped light guide 104 and becomes weak as it is apart from the incidence plane 104a.

On the other hand, in Japanese Patent Laid-Open Nos. 2001-332112 and 2002-40420, there is disclosed an invention aiming at the uniformity of the intensity distribution of the emitted light from the light guide.

In FIG. 17 is shown a constitution of the invention disclosed in these patent publications. A light source device 200 has a depth of a wedge-shaped reflection groove deepened as the groove is apart from the light source in order to enhance the uniformity of the intensity of the emitted light from the light guide. In this way, in the center portion of the light guide, an amount of light incident on the wedge-shaped reflection groove is increased, so that the intensity distribution of the light emitted from the light guide is made uniform.

However, in the case of such constitution, since the depth of the groove is limited by a groove pitch and a groove angle, among the light incident on the light guide, an almost-parallel light is unable to reflect effectively on the groove. As a result, the optical loss arising from the light being repeatedly reflected inside the light guide or the light being emitted from the incidence plane opposite to the incidence plane where it is incident becomes large so that the optical utilization efficiency of the light source device is lowered. That is, an amount of emitted light from the light guide is uniformed in a low state of utilization efficiency, and cognizability of the display device using this light guide becomes low.

In this way, it has been impossible for the light guide equipped with a conventional light source device to allow both the uniformity of the intensity distribution of the emitted light and the enhancement of emitting efficiency to be compatible.

The present invention has been made in view of the above-described problems, and its object is to provide a light guide which is high in emitting efficiency and uniform in the intensity distribution of the emitted light, a light source device equipped with this guide, a display device adopting this device, and an information terminal.

BRIEF SUMMARY OF THE INVENTION

To achieve the above-described object, the present invention as its first aspect provides a light guide characterized in that it emits a light taken from an incidence plane to emit outside of an emitting surface provided at least on a surface adjacent to the incidence plane, wherein, in the surface opposed to the emitting surface, there are periodically formed a total reflecting surface guiding an incident light incident from the incidence plane, alight extracting surface allowing the incident light to reflect toward the emitting surface and emit from the emitting surface, and are-incidence plane which is formed between the light extracting surface and the total reflecting surface and takes the light emitted outside from the light extracting surface again, wherein assuming that a distance between the surface including a bottom of an almost V-shaped groove formed by the light extracting surface and the re-incidence plane and parallel with the emitting surface and an intersection between the total reflecting surface adjacent to the groove and positioned at the incidence plane side and the light extracting surface is taken as d, and a distance between a surface including the bottom of the groove and an intersection between the total reflecting surface adjacent to the groove and positioned at an opposite side of the incidence plane and the re-incidence plane is taken as x, the surface opposed to the emitting surface has a region which is x/d<1, and at least one of d and x is allowed to periodically change, so that the intensity distribution of the light emitted outside from the emitting surface is made uniform.

In the above-described constitution, in the region, which is x/d<1, of the surface opposed to the emitting surface, it is preferable that x-d is taken as being constant and d and x are changed so that the intensity of distribution of the light emitted from the emitting surface is made uniform or in the region, which is x/d<1, of the surface opposed to the emitting surface, it is preferable that x/d is taken as being constant and d and x are changed so that the intensity of distribution of the light emitted from the emitting surface is made uniform.

Since the above-described light guide is periodically formed with the total reflecting surface, the light extracting surface and the re-incidence plane on the surface opposed to the emitting surface, so that the light unable to reflect but transmitting the light extracting surface can be taken into the light guide from the re-incidence plane again and guided into the interior of the light guide, and hence, the emitting efficiency is high.

Further, the distance d between the bottom of the almost V-shaped groove formed by the light extracting surface and the re-incidence plane and the total reflecting surface adjacent to the groove and positioned at the incidence plane side, and the distance x between the bottom of the groove and the total reflecting surface adjacent to the groove and positioned at the opposite side of the incidence plane, are changed by a location, so that the amount of the light taken into the interior of the light guide again from the re-incidence plane after it is not reflected but transmits the light extracting surface can be adjusted. Consequently, in the region in which the intensity of the emitted light is lowered, the amount of light taken into the interior of the light guide from the re-incidence plane is increased so as to increase the amount of the emitted light, thereby making it possible to uniform the intensity of distribution of the emitted light. In this way, the light guide which is high in the emitting efficiency and uniform in the intensity of distribution of the emitted light can be obtained.

Further, in any one of the constitutions of the above described first aspect of the present invention, it is preferable that the light guide is a linear light guide which takes the light emitted from the point light source from the incidence plane and emits it from the emitting surface as a linear light or a sheet-shaped light guide which takes the light emitted from the line light source from the incidence plane and emits it from the emitting surface as a sheet-shaped light.

The light guide of the above-described constitution makes it possible to effectively turn the light emitted from the light source into a uniform line light source or a line light source.

Further, to achieve the above-described object, the present invention as a second aspect provides a light source device which has the light guide of any one of the constitutions of the above-described first aspect of the present invention and comprises the light source allowing the light to be incident on the incidence plane.

Since the light source device of the above-described constitution can emit the light emitted from the light source effectively from the emitting surface, the utilization efficiency of energy is high. Further, the intensity of distribution of the emitted light from the emitting surface is uniform.

In the above-described second aspect of the present invention, it is preferable that an almost sheet-shaped reflecting member is provided, which is adjacent to the total reflecting surface, the light extracting surface and the re-incidence plane and allows the light emitted outside from the light extracting surface to be incident from the total reflecting surface, the light extracting surface and the re-incidence plane.

According to the above-described constitution, from among the light leaked outside of the light guide from the light extracting surface, a part of the light which is not incident again on the light guide from the re-incidence plane can be reflected by the reflecting member so as to be returned to the interior of the light guide. As a result, the emitting efficiency of the light guide is enhanced, and the light source device higher in the optical utilization efficiency can be provided.

Further, to achieve the above-described object, the present invention as a third aspect provides a display device characterized in that a display panel displaying information is illuminated by the light source device of the above-described second aspect of the present invention.

The display device of the above-described constitution comprises a light source device capable of uniformly and effectively illuminating the display panel. Consequently, a display device in which the cognizability of the information displayed is higher and consumption energy is less than a conventional device, can be provided if it is under the same condition.

In the above-described third aspect of the present invention, it is preferable that the light incidence plane of the display panel and the emitting surface of the light guide adhere to each other. According to the above-described constitution, a gap between the light guide and the display panel is reduced so that the display device can be made thin in size.

Further, in the above-described third aspect of the present invention, the display panel has a laminated (layer) structure comprising a plurality of platy members, and it is preferable that the light guide serves as the platy member for allowing the light to be incident on the display panel. According to the above-described constitution, the light guide constitutes a part of the display panel so that the display device can be made thin in size.

Further, to achieve the above-described object, the present invention as a fourth aspect provides an information terminal comprising a display device having any one of the constitutions of the above-described third aspect of the present invention. The information terminal according to the above-described constitution is high in cognizability, and comprises a display device less in consumption energy, and therefore, it is also energy-saving as the information terminal, and is excellent in operability as the cognizableness of the displayed information is good.

DETAILED DESCRIPTION OF THE PREFERRED EMBODIMENTS

First Embodiment

Figure 1A:
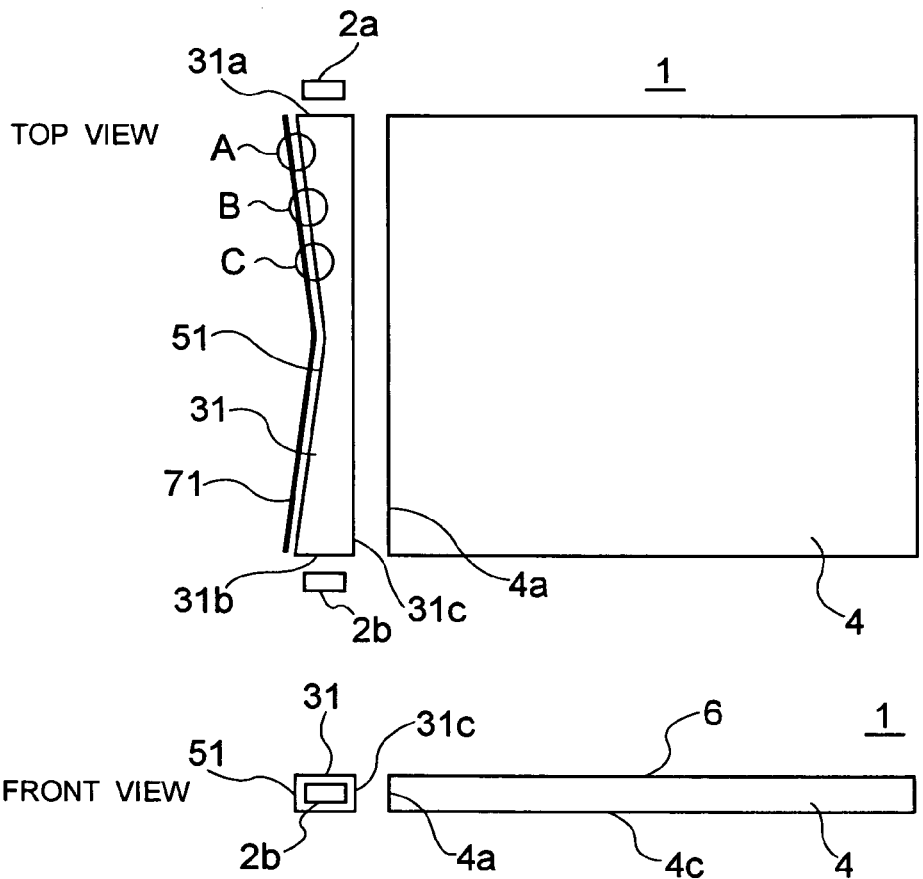
FIG. 1A is a view showing a constitution of a light source device according to a first embodiment having preferably carried out the present invention, and is a top view and a front view schematically representing the constitution of the light source device.
Figure 1B:
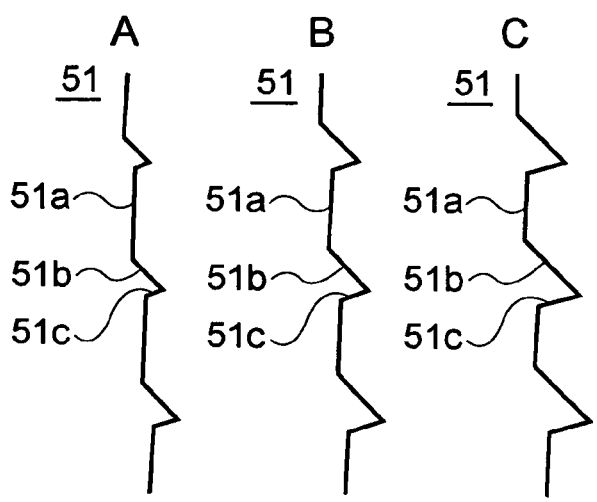
FIG. 1B is an enlarged view of a reflecting portion in A, B and C portions of a linear light guide shown in FIG. 1A.
Figure 1D:
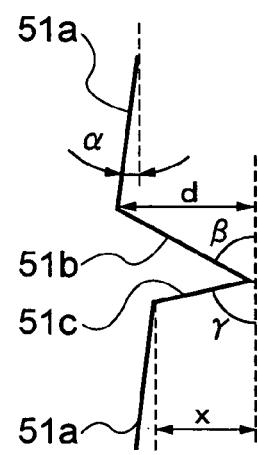
FIG. 1D is a view showing a positional relationship of each portion of the reflecting portion.
Figure 1C:
FIG. 1C is an enlarged view of the reflecting portion in a sheet-shaped light guide.

A first embodiment having preferably carried out the present invention will be described. In FIG. 1 is shown a constitution of a light source device according to the present embodiment. FIG. 1A is a schematic top view and a front view of a light source device 1, FIG. 1B is an enlarged view of a reflecting portion 51 in A, B and C portions of a linear light guide 3 shown in FIG. 1A, and FIG. 1C is an enlarged view of a reflecting portion 6 in a sheet-shaped light guide 4. FIG. 1D is a view showing a positional relationship between respective portions of the reflecting portion 51.

The light source device 1 has a point light source 2 (2a and 2b), a linear light guide 31, the sheet-shaped light guide 4, and a reflecting surface 71.

Each of the point light sources 2a and 2b is a light source which is sufficiently small in a light emitting area for the light source device 1, and, for example, can use a LED, but it is not restricted to this, and can adopt a small light source such as a laser diode (LD) and the like.

For the material of the linear light guide 31 and the sheet-shaped light guide 4, resin having high transparency and glass can be used. As for the material forming these light guides, it is preferable to be as high as possible in transparency. Incidentally, considering an easiness of working and a weight-saving of the light source device 1, it is desirable to perform a formation by using resin, and above all, polycarbonate resin and acryl resin are excellent in transparency and the easiness of working. Further, as for the forming method of the light guide, though there are a compression molding using mold dies, an injection molding and the like in addition to a cutting work for directly cutting resin and glass, when considering productivity and working accuracy, the formation method using mold dies such as the compression molding, the injection molding and the like is desirable. Further, in the case where the light source device 1 is used for a back light of the display device, these light guides may be formed by adopting the material having a property of scattering the light without absorbing it.

In the linear light guide 31, there is formed the reflecting portion 51 on the surface opposed to the emitting surface 31c. The reflecting portion 51, as shown in FIG. 1B, is periodically formed with a total reflecting surface 51a which guides the light incident on the linear light guide 31 from the point light sources 2a and 2b, a light extracting surface 51b which reflects the light guided through the linear light guide 31 so as to emit from the emitting surface 31c, and a re-incidence plane 51c which takes the light transmitted but not reflected on the light extracting surface 51b into the linear light guide 31 again.

Since the depth x of the re-incidence plane 51c is formed in such a way as to become smaller compared to the depth d of the light extracting surface 51b, it is x/d<1, and each total reflecting surface 51a draws to the emitting surface 31c by d−x as it draws to the center portion from both end portions (incidence planes 31a and 31b) of the linear light guide 31. Consequently, the linear light guide 31 is formed in such away as to be narrowest in its width at the center portion and become wide toward both end portions (incidence planes 31a and 31b).

In the present embodiment, since d−x gradually increases d while remaining constant as it draws on the center from both end portions (incidence planes 31a and 31b) of the linear light guide 31, x also increases as it draws to the center. Consequently, as shown in FIG. 1B, in the C portion close to the center portion of the linear light guide 31, the depth d of the light extracting surface 51b and the depth x of the re-incidence plane 51c are equally larger compared to the A portion and B portion.

In the sheet-shaped light guide 4, there is formed a reflecting portion 6 on the surface opposed to an emitting surface 4c. As shown in FIG. 1C, the reflecting portion 6 of the sheet-shaped light guide 4 is periodically formed with a total reflecting surface 6a which guides the light incident on the sheet-shaped light guide 4 and a light extracting surface 6b which reflects the light so that the light advancing inside the sheet-shaped light guide 4 is emitted from an emitting surface 4c.

A reflecting surface 71 is high in a reflectivity of light, and can be formed by resin or a film scattering a reflecting light. More preferably, a prism reflecting sheet and the like having a function to allow the reflected light to be incident on the linear light guide 31 from the reflecting portion 5 in a direction vertical to an emitting surface 3c of the linear light guide 3 may be used.

The reflecting surface 71 is disposed close to the reflecting portion 51 of the linear light guide 31, and allows the light transmitted but not reflected on the light extracting surface 51b of the linear light guide 31 and not taken into the linear light guide 31 from the re-incidence plane 51c to reflect and to be incident on the linear light guide 31 again. The efficiency of this re-incidence is lowered when the reflecting surface 71 is disposed so as to be separated from the reflecting portion 51 of the linear light guide 31. Hence, it is preferable that the reflecting surface 71 is disposed close to the reflecting portion 51 of the linear light guide 31, and it is more preferable that the reflecting surface 71 is disposed so as to be close to a part (the total reflecting surface 51a, an edge portion made by the total reflecting surface 51a and the light extracting surface 51b, and an edge portion made by the total reflecting surface 51a and the re-incidence plane 51c) of the reflecting portion 51.

In the light source device 1 of the above-described constitution, a preferable shape of the reflecting portion 51 of the linear light guide 31 will be described.

An angle a shown in FIG. 1D represents an angle for the emitting surface 31c of the total reflecting surface 51a. When this angle is large, the depth x of the re-incidence plane 51c becomes small, and in the re-incidence plane 51c in the vicinity of the center portion of the linear light guide 31, the effect of taking the light transmitted but not reflected on the light extracting surface 51binto the linear light guide 31 again be comes small.

Further, when the angle α is below 0°, the angle for the emitting surface 31c of the light guided inside the linear light guide 31 becomes small every time it is reflected on the total reflecting surface 51a. Consequently, the light incident on the linear light guide 3 from the point light sources 2a and 2b does not satisfy a total reflecting condition in the course of reflecting on a total reflecting surface 5a, and leaks outside from the linear light guide 31 (the light reflected on the total reflecting surface 51a emits from the emitting surface 31cwithout passing through the light extracting surface 51b). However, even when the angle α is below 0°, if the absolute value is small, this phenomenon actually does not cause any problem.

For the above-described reason, the angle α is preferably within −1 to 5°, and more preferably, it is 0°.

When an angle β for the emitting surface 31c of the light extracting surface 51b is too large, the amount of light capable of reflecting in the light extracting surface 51b becomes small, and the emitting efficiency from the linear light guide 31 becomes low. Further, when the angle β is too small, the angle made by the light reflecting in the light extracting surface 51b and the emitting surface 31c becomes large, and the transitivity from the emitting surface 31c is lowered so that the emitting efficiency from the linear light guide 31 is lowered. For the above-described reason, the angle β is preferably 30 to 60°, and more preferably 40 to 50° to enhance the emitting efficiency from the linear light guide 31.

Further, to effectively collect the light leaked outside of the linear light guide 31 from the light extracting surface 51b, the re-incidence plane 51c is preferably close to the light extracting surface 51. Consequently, an angle γ for the emitting surface 31c of the re-incidence plane 51c is preferably large. However, when γ is larger than 90°, it becomes difficult to form the reflecting portion 51 on the linear light guide 31. For the above-described reason, γ is preferably 60 to 90°, and particularly more preferably 80 to 90°.

In the light source device 1 of the present embodiment, in a direction to which the point light source 2 emits the light, there is disposed the linear light guide 31, and in a direction to which the linear light guide 31 emits the light, there is disposed the sheet-shaped light guide 4. The reflecting surface 71, as shown in FIG. 1A, is disposed close to the reflecting portion 51 of the linear light guide 31.

In the above-described light source device 1, the light emitted from the point light sources 2a and 2b is reflected on the reflecting portion 51 formed at the side surface of the linear light guide 31, so that it is turned into a line light source and incident on the sheet-shaped light guide 4. The light incident on the sheet-shaped light guide 4 is reflected in the reflecting portion 6 formed on the surface opposed to the emitting surface 4c of the sheet-shaped light guide 4, and is turned into a sheet light source.

Since, in the reflecting portion 51 of the linear light guide 31 equipped with the light source device 1, there is provided the re-incidence plane 51c, the light transmitting the light extracting surface 51b can be taken in again and guided inside the linear light guide 31, and therefore, the emitting efficiency from the linear light guide 31 is extremely high.

Figure 2A:
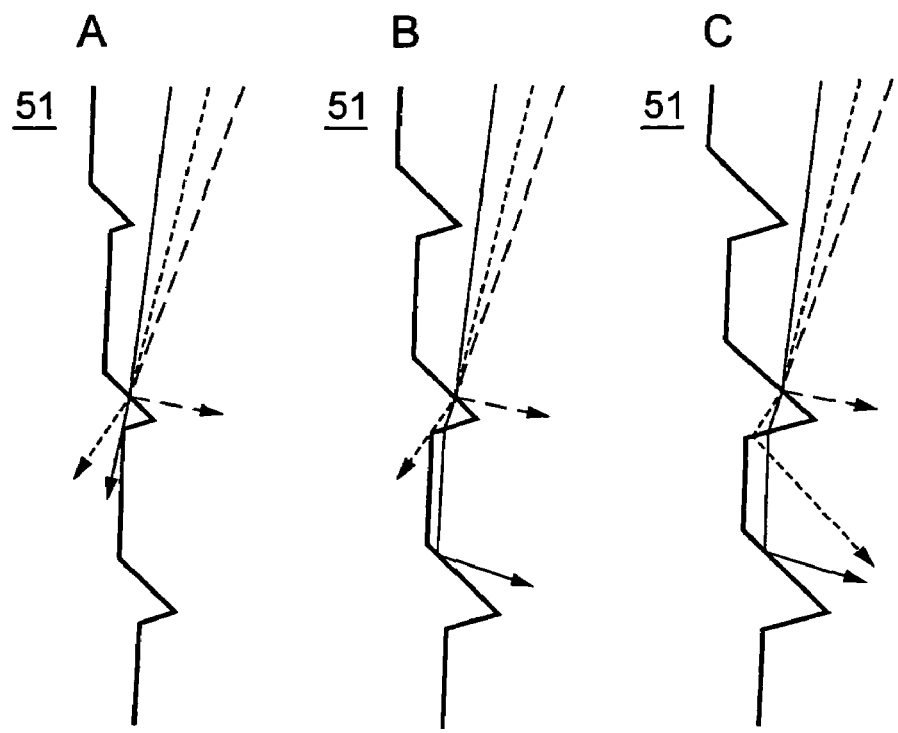
FIG. 2A is a view showing the behavior of a light in the reflecting portion of the linear light guide equipped with the light source device according to the first embodiment.

Further, in FIG. 2A is schematically shown the behavior of the light at the reflecting portion 51 in A, B and C portions of the linear light guide 31 shown in FIG. 1A. Further, in FIG. 2B is shown the intensity of distribution of the light emitted from the linear light guide 31 equipped with the light source device 1.

In the present embodiment, as described above, in the C portion close to the center portion of the linear light guide 31, the depth d of the light extracting surface and the depth x of the re-incidence plane 51c are equally larger compared to the A portion and B portion. Consequently, as shown in FIG. 2A, in the C portion close to the center portion of the linear light guide 31, the amount of light reflected on the light extracting surface 51b and turned into the line light source is large compared to the A portion and B portion. Further, among the light transmitted but not reflected on the light extracting surface 51b, the amount of light taken in the linear light guide 31 from the re-incidence plane 51c again is also large.

Figure 2B:
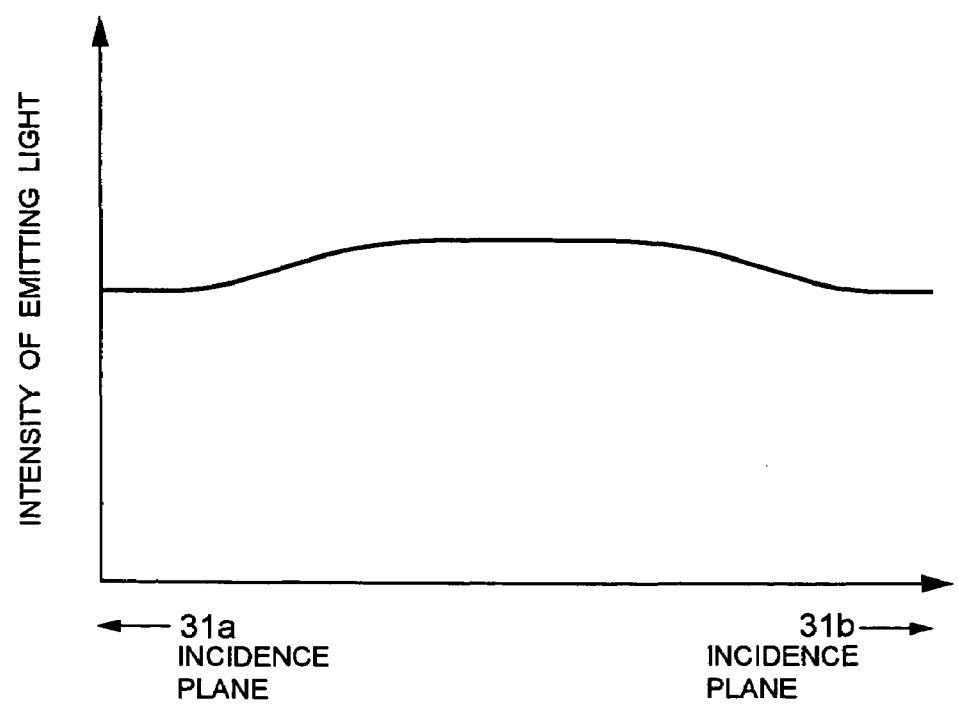
FIG. 2B is a view showing the intensity of distribution of an emitting light from the linear light guide.

Consequently, in the conventional light source device, the distribution of the amount of emitted light from the sheet-shaped light guide becomes uneven or the amount of emitted light ends up being lowered, while in the light source device 1 of the present embodiment, as shown in FIG. 2B, the amount of emitted light at the center portion of the linear light guide 31 becomes large, and the intensity of distribution of the emitted light from the linear light guide 31 is also made uniform. In this way, the light source device in which the intensity of distribution of the emitted light is uniform and the optical utilization efficiency is high can be obtained.

Incidentally, here, though the depth d of the light extracting surface 51b of the linear light guide 31 (distance between the bottom of the almost V-shaped groove formed by the light extracting surface 51b and the re-incidence plane 51c and the total reflecting surface 51a adjacent to the groove and positioned at the incidence plane 31a side) and the depth x of the re-incidence plane 51c (distance between the bottom of the groove and the total reflecting surface 51a adjacent to this groove and positioned at the opposite side of the incidence plane 31a) are changed so that d−x becomes constant, it is not restricted to this, but by changing at least either of d and x, the same effect can be obtained.

Further, in the present embodiment, though d and x are gradually changed as they draw to the center portion from both end portions (31a and 31b) of the linear light guide 31. However, even when they are changed only at a part of the linear light guide 31 such as being changed only in the vicinity of the center portion of the linear light guide 31, the same effect can be obtained.

Further, though the shape of the linear light guide 31 was described as an example in which it is narrowest in its width at the center portion and becomes wide toward both end portions (incidence planes 31a and 31b), it is not restricted to this, but even when the narrowest place in width is not the center portion of the linear light guide 31, the same effect can be obtained.

Figure 15A:
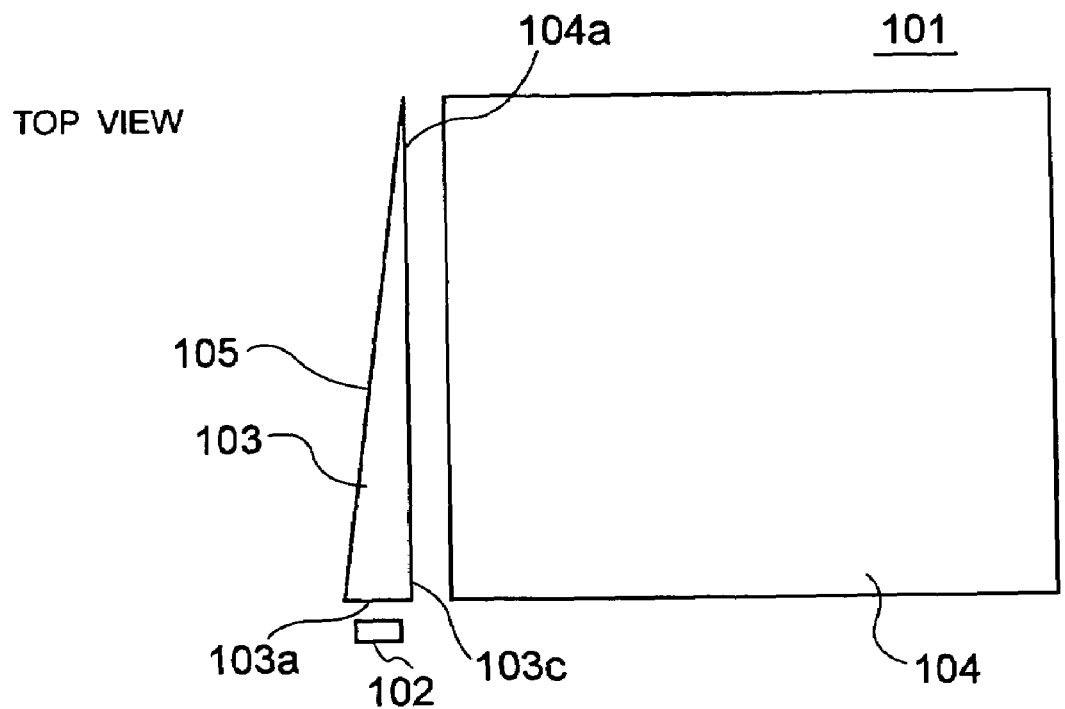
FIGS. 15A and 15B are views showing a constitutional example of a conventional light source device.
Figure 15B:
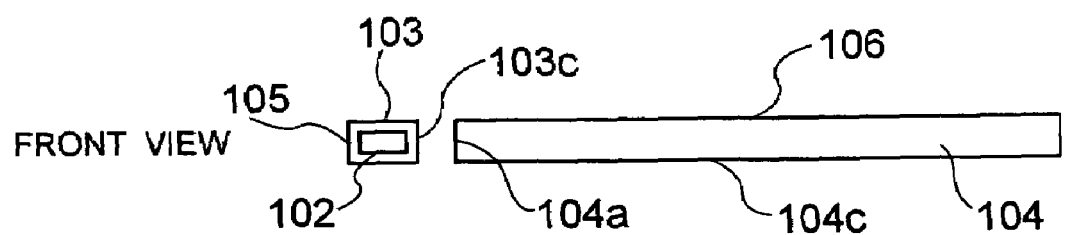
Figure 16A:
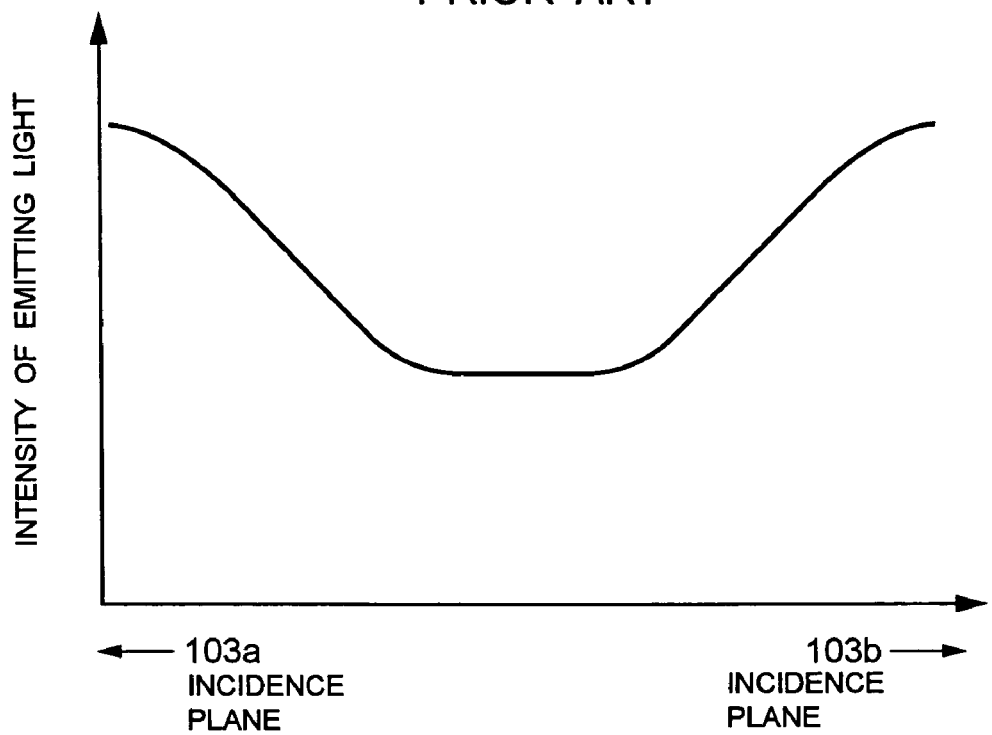
FIGS. 16A and 16B are views showing the intensity of distribution of a conventional light source device.
Figure 16B:
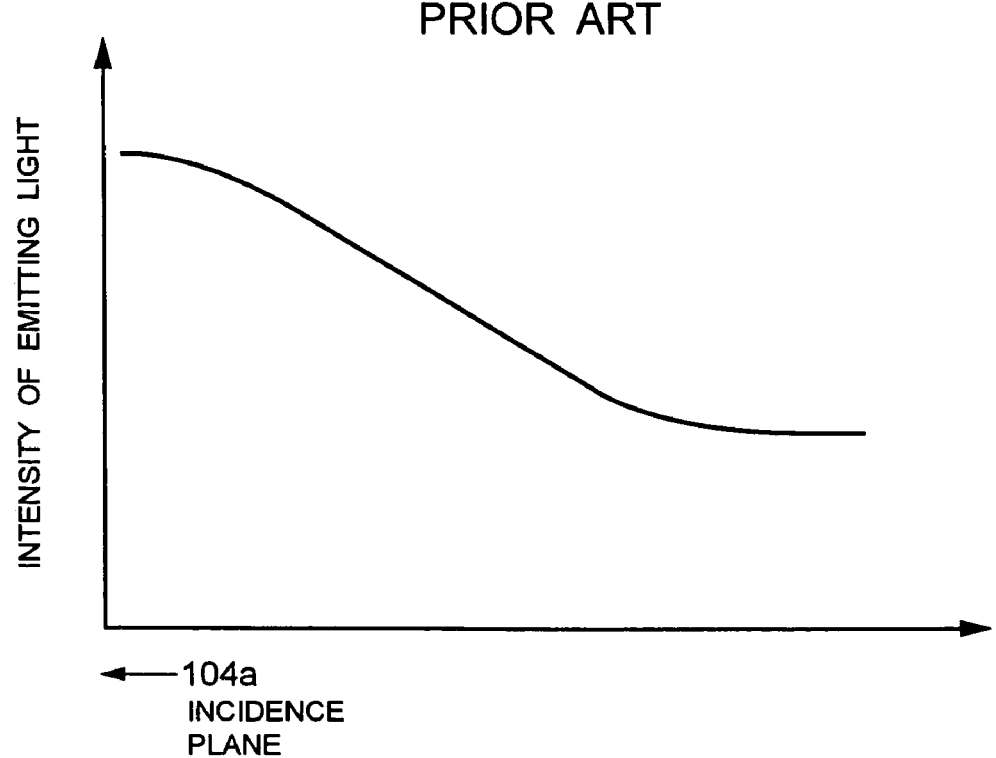
Figure 17:
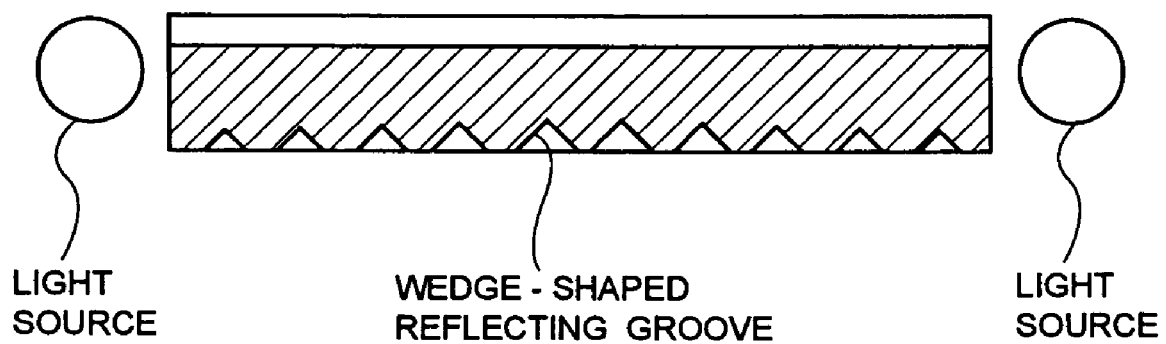
FIG. 17 is a view showing a constitutional example of a conventional light source device.

Further, in the present embodiment, though the constitution using two pieces of the point light sources was described as an example, it is not limited to this, and even when the constitution using one piece of the point light source with a shape of the linear light guide 31 turned into a wedge form as shown in FIG. 15 can obtain the same effect as described above. Further, even by using plural pieces of the point light sources disposed respectively instead of the point light sources 2a and 2b, the same effect can be obtained as described above.

Second Embodiment

Figure 3A:
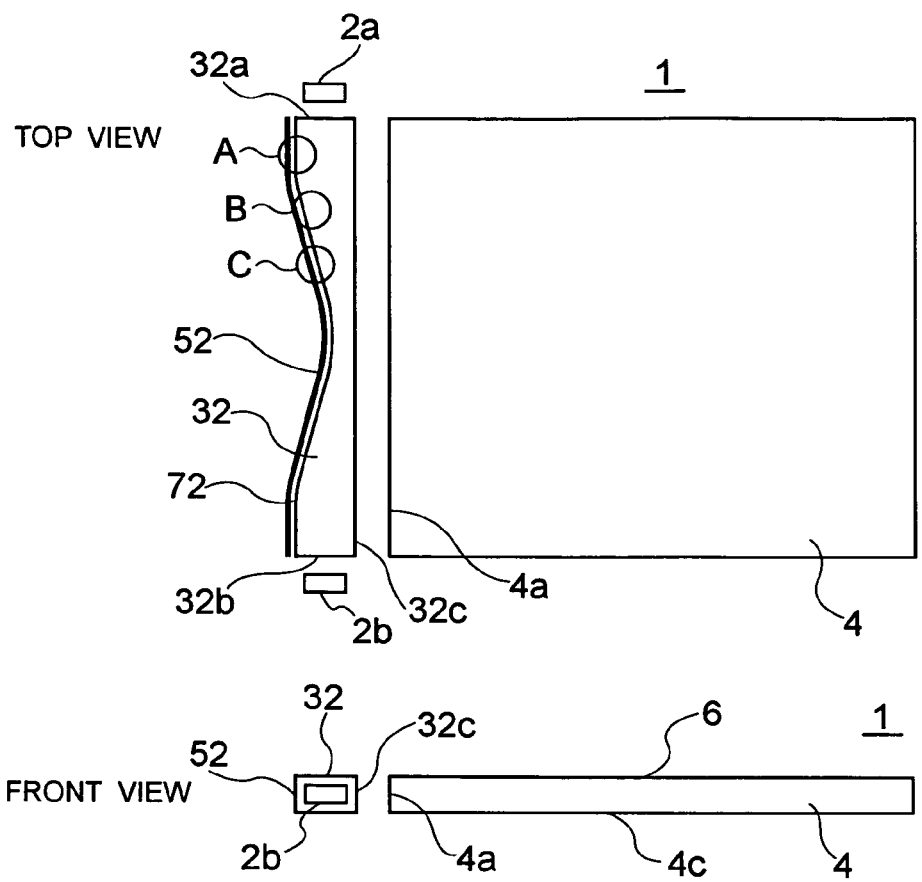
FIG. 3A is a view showing the constitution of the light source device according to a second embodiment having preferably carried out the present invention, and is a top view and a front view schematically representing the structure of the light source device.
Figure 3B:
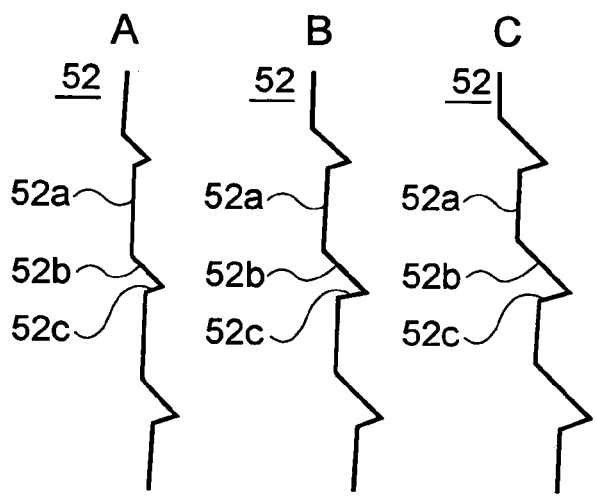
FIG. 3B is an enlarged view of the reflecting portion in A, B and C portions of the linear light guide shown in FIG. 3A.

A second embodiment having preferably carried out the present invention will be described. In FIG. 3 is shown a light source device 1 according to the present embodiment. FIG. 3A is a schematic top view and a front view of the light source device 1, FIG. 3B is an enlarged view of a reflecting portion 52 in A, B and C portions of a linear light guide 32 shown in FIG. 3A, and FIG. 3C is an enlarged view of a reflecting portion 6 in a sheet-shaped light guide 4.

Similarly with the first embodiment, the light source device 1 has point light sources 2 (2a and 2b), a linear light guide 32, a sheet-shaped light guide 4, and a reflecting surface 72.

The point light source 2 (2a and 2b), the sheet-shaped light guide 4, the reflecting surface 72 are the same as the first embodiment. Although the linear light guide 32 is almost the same as the linear light guide 31 of the first embodiment, a reflecting portion 52 of the linear light guide 32 of the present embodiment allows d and x to gradually increase with x/d kept constant which is a ratio of a depth x of a re-incidence plane 52c and a depth d of a light extracting surface 52b as the portion 52 draws on the center portion from both end portions (incidence planes 32a and 32b).

Figure 4A:
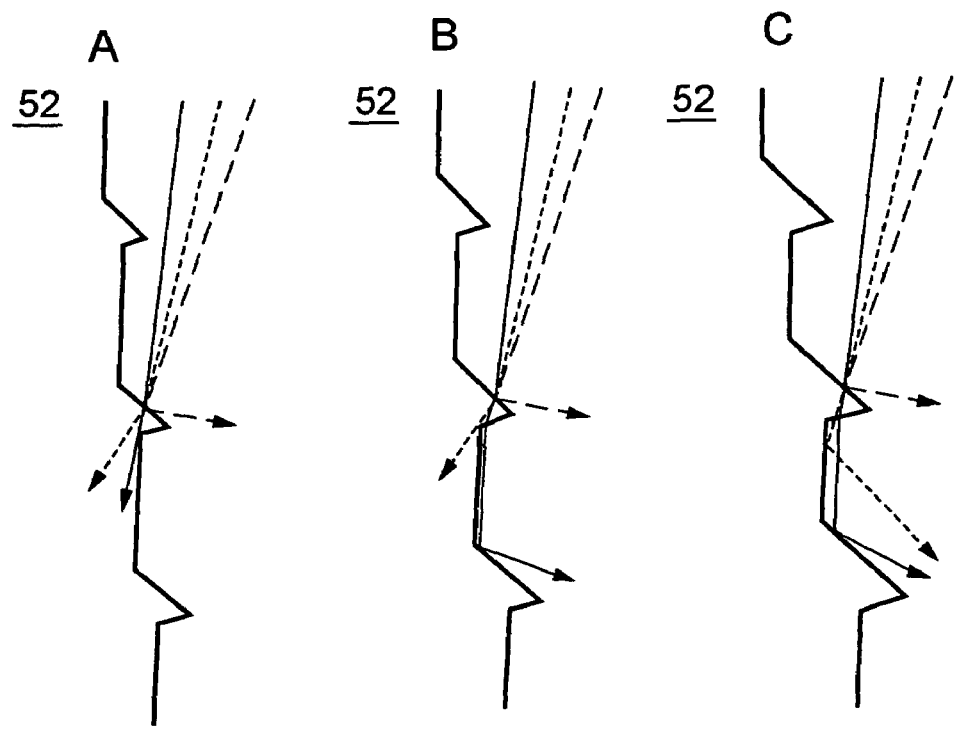
FIG. 4A is a view showing the behavior of the light in the reflecting portion of the light guide equipped with the light source device according to the second embodiment.

Further, in FIG. 4A is schematically shown a behavior of the light at the reflecting portion 52 in the A, B and C portions of the linear light guide 32 shown in FIG. 3A. Further, in FIG. 4B is shown the intensity of distribution of the light emitted from the linear light guide 32 equipped with the light source device 1.

In the present embodiment, as described above, in the C portion close to the center portion of the linear light guide 32, the depth d of the light extracting surface 52b and the depth x of the re-incidence plane 52c are equally large comparing to the A portion and B portion. Consequently, as shown in FIG. 4A, in the C portion close to the center portion of the linear light guide 32, the amount of light reflected on the light extracting surface 52b and turned into a line light source is large comparing to the A portion and B portion. Further, among the light transmitted but not reflected on the light extracting surface 52b, the amount of light took into the linear light guide 32 again from the re-incidence plane 52c is also large.

Figure 4B:
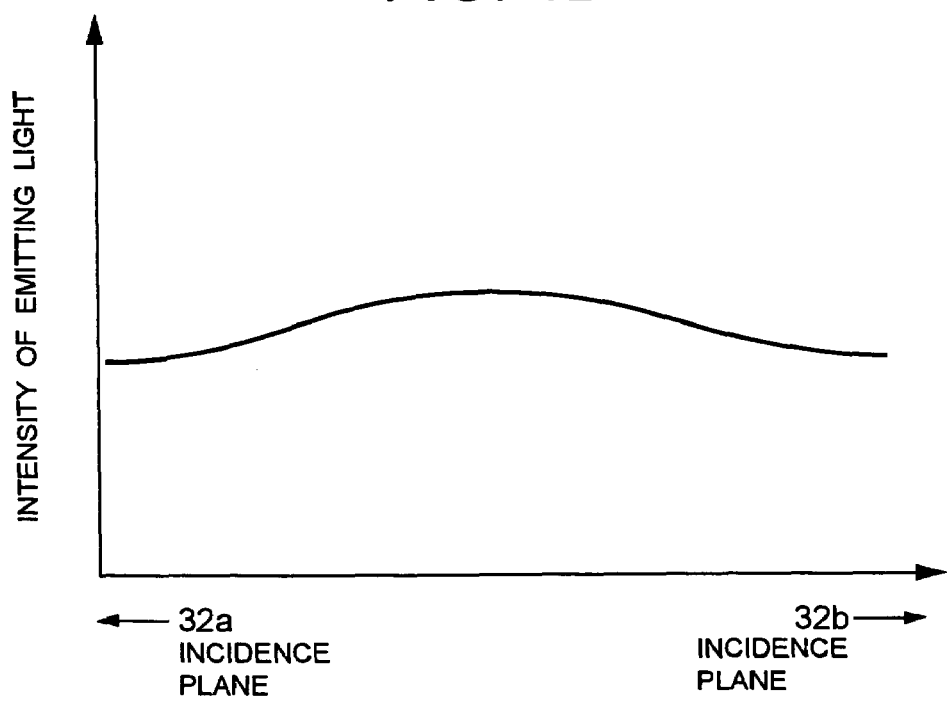
FIG. 4B is a view showing the intensity of distribution of the emitting light from the light guide.

Consequently, in the conventional light source device, the distribution of the amount of emitted light from the sheet-shaped light guide becomes uneven or the amount of emitted light ends up being lowered, while in the light source device 1 according to the present embodiment, as shown in FIG. 4B, the amount of emitted light at the center portion of the linear light guide 32 becomes large, and the intensity of distribution of the emitted light from the linear light guide 32 is also uniformed. In this way, the light source device in which the intensity of distribution of the emitted light is uniform and the optical utilization efficiency is high, can be obtained.

Figure 3D:
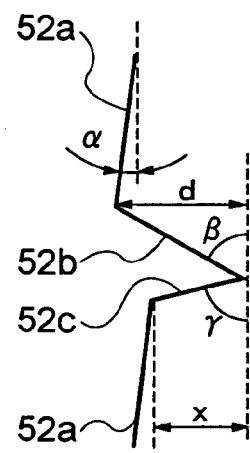
FIG. 3D is a view showing a positional relationship of each portion of the reflecting portion.
Figure 3C:
FIG. 3C is an enlarged view of the reflecting portion in the sheet-shaped light guide.

Incidentally, as shown in FIG. 3D, the angle made by each surface of the total reflecting surface 52a, the light extracting surface 52b and the re-incidence plane 52c is the same as that of the first embodiment, and the range of each angle is also the same as that of the first embodiment.

In this way, the light source device according to the present embodiment can obtain the same effect as that of the light source device of the first embodiment.

Third Embodiment

Figure 5A:
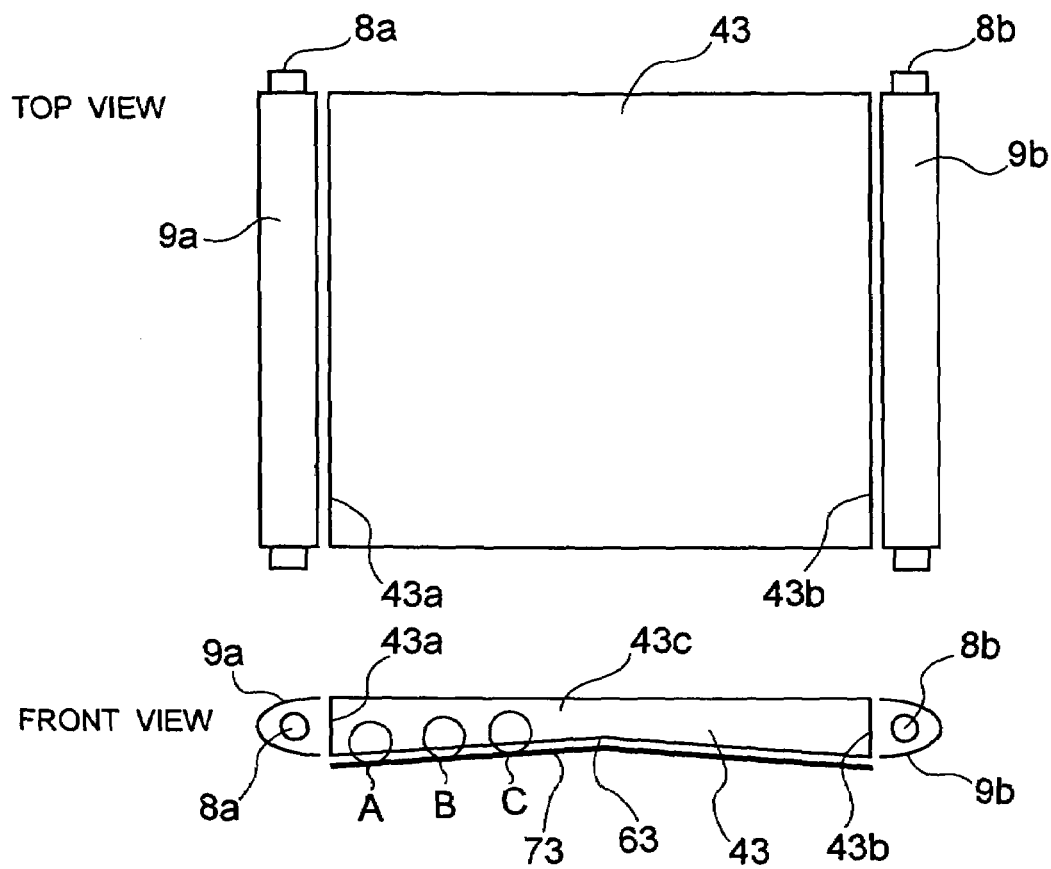
FIG. 5A is a view showing the constitution of the light source device according to a third embodiment having preferably carried out the present invention, and is a top view and a front view schematically representing the constitution of the light source device.
Figure 5B:
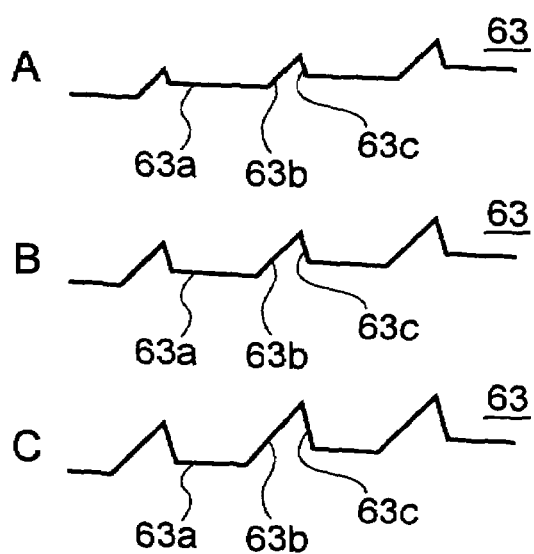
FIG. 5B is an enlarged view of the reflecting portion in A, B, and C portions of the sheet-shaped light guide shown in FIG. 5A.

A third embodiment having preferably carried out the present invention will be described. In FIG. 5 is shown a light source device 1 according to the present embodiment. FIG. 5A is a schematic top view and a front view of the light source device 1, and FIG. 5B is an enlarged view of a reflecting portion 63 in A, B and C portions of a sheet-shaped light guide 43 shown in FIG. 5A.

The light source device 1 has the sheet-shaped light guide 43, a reflecting surface 73, a line light source 8 (8a and 8b), and a reflector 9 (9a and 9b).

The reflecting surface 73, as shown in FIG. 5A, is disposed close to the reflecting portion 63 of the sheet-shaped light guide 43. Further, the reflector 9a and 9b have a nearly equal thickness as that of the sheet-shaped light guide 43, and enhances the incident efficiency toward the sheet-shaped light guide 43 of the light emitted from the line light sources 8a and 8b.

The line light sources 8a and 8b are a light source which is sufficiently small in a light emitting area for the sheet-shaped light guide 43, and, for example, can use CCFL, but they are not restricted to this, and those in which plural pieces of compact light sources such as LED and the like are linearly lined up may be used. Further, in the case where plural pieces of light sources are linearly lined up and disposed, each compact light source may be disposed to be on top of each other or may be disposed to be spaced apart.

As for the material of the reflector 9, a metal high in a reflectivity of light, resin vaporizing or plating the metal high in a reflectivity of light and the like can be used. As for the metal high in a reflectivity of light, silver, aluminum and the like can be cited.

In the sheet-shaped light guide 43, there is formed a reflecting portion 63 on the surface opposed to an emitting surface 43c. The reflecting portion 63 has the same shape as that of the reflecting portion 51 formed on the liner light guide 31 of the first embodiment. That is, the reflecting portion 63, as shown in FIG. 5B, is periodically formed with a total reflecting surface 63a which guides the light incident on the sheet-shaped light guide 43 from the line light sources 8a and 8b, a light extracting surface 63b which allows the light guided inside the sheet-shaped light guide 43 to reflect in such a way to emit from the emitting surface 43, and a re-incidence plane 63c which takes the light transmitted but not reflected on the light extracting surface 63b inside the sheet-shaped light guide 43 again. As for the material and the forming method of the sheet-shaped light guide 43, they are the same as those of the first embodiment.

Since the depth x of the re-incidence plane 63c is formed in such a way as to become small comparing to the depth d of the light extracting surface 63b, it is x/d<1, and the total reflecting surface 63a draws to the emitting surface 43c by d−x as it draws to the center portion from both end portions (incidence planes 43a and 43b) of the sheet-shaped light guide 43. Consequently, the sheet-shaped light guide 43 is formed in such a way as to become narrowest in its width at the center portion, and becomes thick toward both end portions (incidence planes 43a and 43b).

In the present embodiment, since d−x remains constant with d gradually increased as they draw to the center from both end portions (incidence planes 43a and 43b) of the sheet-shaped light guide 43, x is also gradually increased as it draws to the center. Consequently, as shown in FIG. 5B, in the C portion close to the center of the sheet-shaped light guide 43, the depth d of the light extracting surface 63b and the depth x of the re-incidence plane 63c are equally large comparing to the A portion and B portion.

Figure 5C:
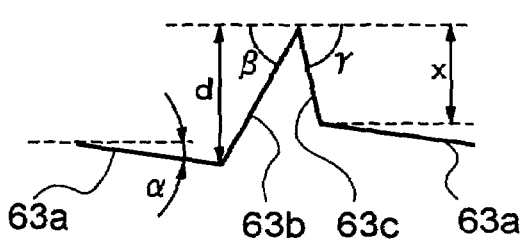
FIG. 5C is a view showing the positional relationship of each portion of the reflecting portion.

Incidentally, as shown in FIG. 5C, the angle made by each surface of the total reflecting surface 63a, the light extracting surface 63b and the re-incidence plane 63c is the same as that of the reflecting portion 51 of the linear light guide 31 of the first embodiment, and the range of each angle is also the same as that of the reflecting portion 51 of the linear light guide 31 of the first embodiment.

The reflecting surface 73 is disposed close to the reflecting surface 63 of the sheet-shaped light guide 43, and is not totally reflected on the light extracting surface 63b of the sheet-shaped light guide 43, but transmits it, and reflects the light which is not took in the sheet-shaped light guide 43 from the re-incidence plane 63c so as to allow it to be incident again on the sheet-shaped light guide 43. When the reflecting surface 73 is disposed apart from the reflecting portion 63 of the sheet-shaped light guide 43, the efficiency of re-entrance is lowered. Consequently, the light reflecting surface 73 is preferably disposed close to the reflecting portion 63, and is more preferably disposed close to a part (the total reflecting surface 63a and an edge portion made by the total reflecting surface 63a and the light extracting surface 63b, and an edge portion made by the total reflecting surface 63a and the re-incidence plane 63c) of the reflecting portion 63.

A reflecting surface 73 is high in a reflectivity of light, and can be formed by resin or a film scattering a reflecting light. More preferably, a prism reflecting sheet and the like having a function to allow the reflected light to be incident on the sheet-shaped light guide 43 from the reflecting portion 63 in a direction vertical to an emitting surface 43c of the linear light guide 43 may be used.

In the above-described light source device 1, the light emitted from the line light sources 8a and 8b is reflected directly or by the reflectors 9a and 9b, and after that, it is incident on the sheet-shaped light guide 43. The light incident on the sheet-shaped light guide 43 is reflected on the reflecting portion 63 formed on the other surface of the sheet-shaped light guide 43 so that it is turned into a sheet light source.

In the present embodiment, the sheet-shaped light guide 43 is provided with the reflecting portion 63 of the same constitution as that of the reflecting portion 51 equipped with the linear light guide 31 of the first embodiment, so that the emitting efficiency from the sheet-shaped light guide 43 is high and the intensity of distribution of the emitted light from the sheet-shaped light guide 43 is made uniform.

As described above, the light source device which is uniform in the intensity of distribution of the emitted light and high in the optical utilization efficiency can be obtained.

Incidentally, the above-described effect is obtained, not only in the case where the same constitution as that of the reflecting portion 51 equipped with the sheet-shaped light guide 31 of the first embodiment is applied to the reflecting portion 63 of the sheet-shaped light guide 43 in the present embodiment, but also, for example, in the case where the same constitution as that of the reflecting portion 52 equipped with the linear light guide 32 of the second embodiment is also adopted to the reflecting portion 63.

Fourth Embodiment

Figure 6A:
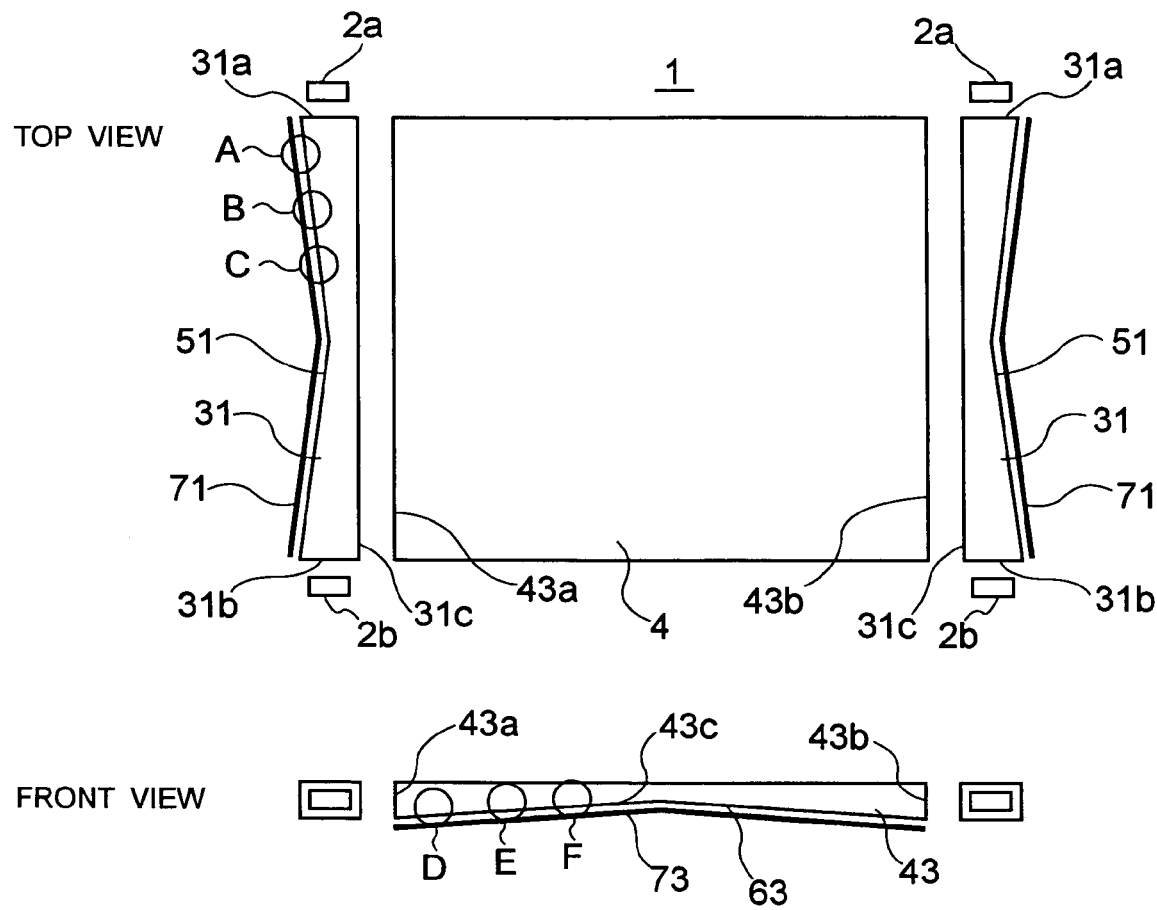
FIG. 6A is a view showing the constitution of the light source device according to a fourth embodiment having preferably carried out the present invention, and is a top view and a front view schematically representing the constitution of the light source device.
Figure 6B:
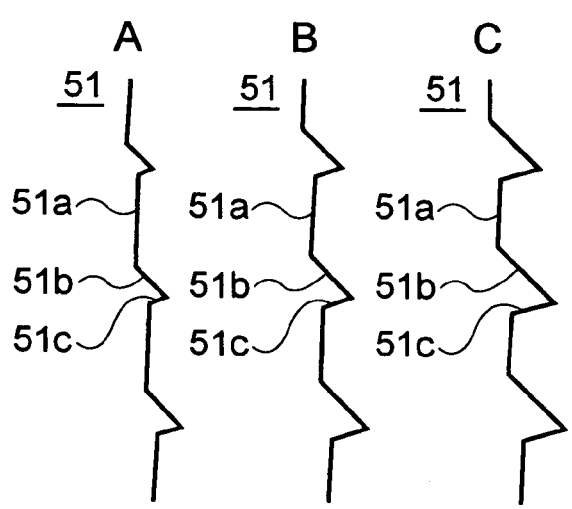
FIG. 6B is an enlarged view of the reflecting portion in A, B and C portions of the sheet-shaped light guide shown in FIG. 6A.
Figure 6C:
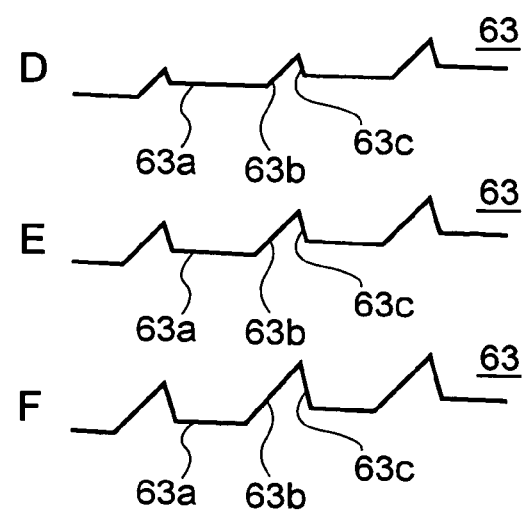
FIG. 6C is an enlarged view of the reflecting portion in D, E and F portions of the sheet-shaped light guide shown in FIG. 6A.

A fourth embodiment having preferably carried out the present invention will be described. In FIG. 6 is shown a light source device 1 according to the present embodiment. FIG. 6A is a schematic top view and a front view of the light source device 1, FIG. 6B is an enlarged view of a reflecting portion 51 in A, B, and C portions of a linear light guide 31 shown in FIG. 6A, and FIG. 6C is an enlarged view of a reflecting portion 63 in D, E and F portions of a sheet-shaped light guide 43 shown in FIG. 6A.

The light source device 1 has a point light source 2 (2a and 2b), a linear light guide 31, a sheet-shaped light guide 43, and reflecting surfaces 71 and 73.

The light source 2, the linear light guide 31 and the reflecting surface 71 are the same as those of the first embodiment. Further, the sheet-shaped light guide 43 and the reflecting surface 73 are the same as those of the third embodiment.

In the present embodiment, in either case where the light emitted from the point light source 2 is turned into a line light source in the linear light guide 31 or the light emitted from the linear light guide 31 is turned into a sheet light source in the sheet-shaped light guide 43, the emission efficiency of the light guide is high, and the intensity of the emitted light is also made uniform.

In this way, the light source device, which is higher in the utilization efficiency than the light source device shown in the first and second embodiments and uniform in the intensity of distribution of the emitted light, can be realized.

Incidentally, here, though the case of using the linear light guide 31 having the same constitution as that of the first embodiment and the sheet-shaped light guide 43 having the same constitution as the third embodiment was described as an example, the linear light guide 32 having the same constitution as that of the second embodiment may be used. Further, even when the reflecting surface 63 of the sheet-shaped light guide 43 has the same constitution as the reflecting surface 52 of the linear light guide 32 of the second embodiment, the same effect can be obtained.

Fifth Embodiment

Figure 7:
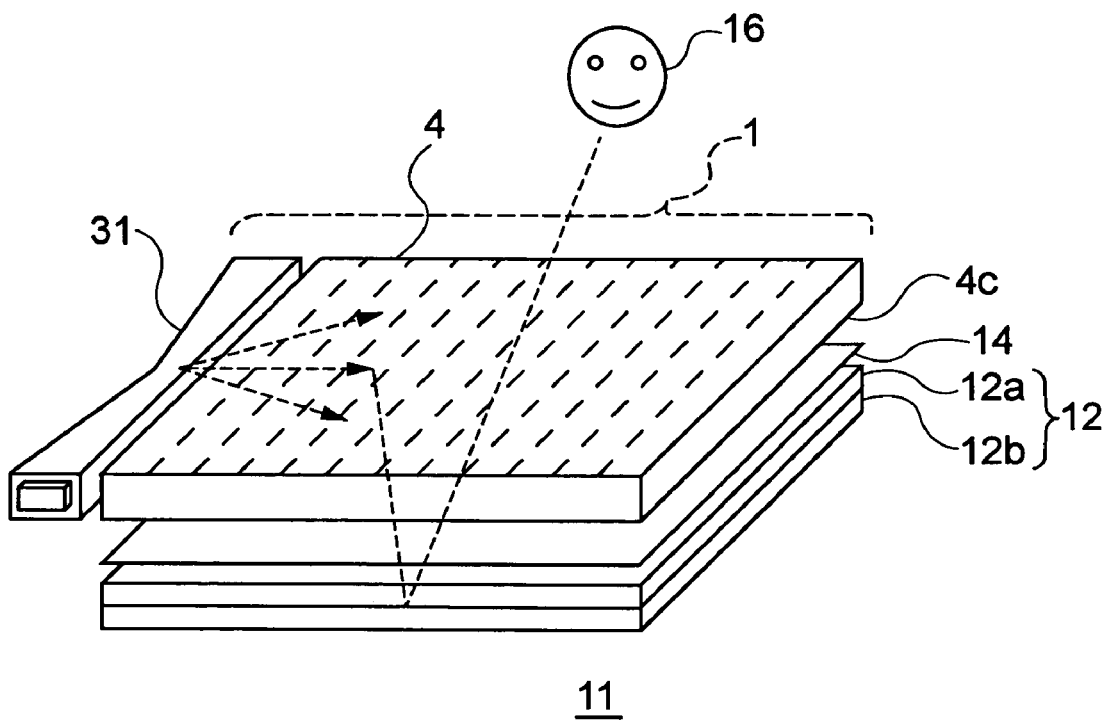
FIG. 7 is a view showing the constitution of the display device according to a fifth embodiment having preferably carried out the present invention.

A fifth embodiment having preferably carried out the present invention will be described. In FIG. 7 is shown a schematic oblique view of a display device 11 according to the present embodiment. The display device 11 is a display device comprising the same light source device 1 as that of the first embodiment as a front light.

As shown in FIG. 7, in an emitting direction of an emitting surface 4c of a sheet-shaped light guide 4 equipped with the light source device 1, there is provided a reflection type liquid crystal panel 12. The reflection type liquid crystal panel 12 is adhered or stuck with an optical film layer 14 on a substrate 12a opposed to the emitting surface 4c of the light source device 1.

The reflection type liquid crystal panel 12 comprises a first substrate 12a having a transparent electrode and being transparent itself and a second substrate 12b in which a switching element to drive a liquid crystal is provided for each reflecting pixel electrode, and has a constitution in which both these reflecting pixel electrode and the transparent electrode are counter-disposed and a liquid crystal is inserted there between.

For the reflection type liquid crystal panel 12, a reflection type liquid crystal panel of not only such an active matrix type, but also a simple matrix type may be used. Further, apart from a type of providing the reflecting pixel electrode within the reflection type liquid crystal panel 12, a reflection type liquid crystal panel using the substrate 12b for the transparent electrode and providing a reflecting surface on the outside surface of the reflection type liquid crystal panel 12 may be used. Further, the reflection type liquid crystal panel 12 is not limited to this type only, but other reflection type display device requiring an auxiliary light source, for example, an electrophoresis display may be used.

The optical film layer 14 is provided so that information displayed on the reflection type liquid crystal panel 12 can be cognizable by the naked eye, and is constituted by at least one from among a polarizing layer for transmitting a specific polarizing component only and a phase difference layer for performing an optical compensation of a liquid crystal. A part of the optical film layer 14 may be provided within the reflection type liquid crystal panel 12.

In the above-described display device 11, the light emitted from the emitting surface 4c of the light source device 1 passes through the optical film layer 14 and enters the reflection type liquid crystal panel 12, and is reflected on the reflecting pixel electrode formed in the substrate 12b of the reflection type liquid crystal panel 12. After that, the light passes through the light source device 1 and reaches the eye of an observer 16.

Since the light source device 1 is the same as that of the firs embodiment, the emitting light from the light source device 1 is uniform in the intensity of distribution, and the optical utilization efficiency is high. Hence, the display device 11 according to the present embodiment as shown in FIG. 7 is high in the cognizability of information (characters, images and the like) displayed in the liquid crystal display panel 12, and the utilization of energy is high. Consequently, in the case where the point light source 2 converts energy so as to emit the light, an electric power saving is possible.

Consequently, in the present embodiment, the display device 11 is not limited to the constitution adopting the same light source device as the first embodiment, and even when it is the same constitution adopting the same light source device as the second and third or the fourth embodiments, the same effect can be obtained.

Sixth Embodiment

Figure 8:
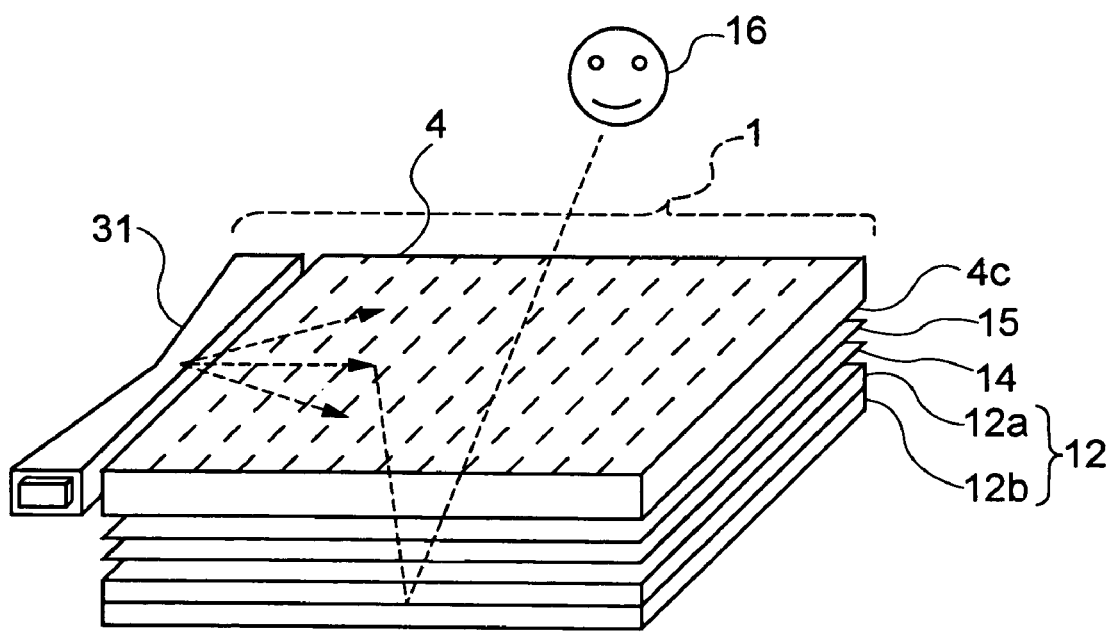
FIG. 8 is a view showing the constitution of the display device according to a sixth embodiment having preferably carried out the present invention.

A six embodiment having preferably carried out the present invention will be described. In FIG. 8 is shown a schematic oblique view of a display device 11 according to the present embodiment. The display device 11 is a display device comprising the same light source device 1 as that of the first embodiment as a front light.

As shown in FIG. 8, in an emitting direction of an emitting surface 4c of a sheet-shaped light guide 4 equipped with a light source device 1, there is provided a reflection type liquid crystal panel 12. In the reflection type liquid crystal panel 12, on a substrate opposed to an emitting surface 12a of a sheet-shaped light guide 4 equipped with the light source device 1, there is adhered or stuck an optical film layer 14. Further, between the sheet-shaped light guide 4 and the optical film layer 14, there is provided a low refractive index layer 15, which allows the sheet-shaped light guide 4 and the optical film layer 14 to be adhered or stuck.

The reflection type liquid crystal panel 12 and the optical film layer 14 are the same as those of the fifth embodiment.

The low refractive index layer 15 preferably adopts a layer being low in an absorptivity of light. Further, when assuming that the refractive index of the sheet-shaped light guide 4 is taken as $n_1$, the refractive index of the optical film layer 14 as $n_2$, and the refractive index of the low refractive index layer as $n_3$, so that the light guides the sheet-shaped light guide 4 of the light source device 1 is totally reflected on the emitting surface 4c of the sheet-shaped light guide 4, it is preferable to choose materials so as to satisfy $n_3<n_1$, $n_3<n_2$. As such resin, silicon system resin, fluorine system resin, acryl system resin and the like can be used.

Further, in the case where the optical film layer 14 is provided within the reflection type liquid crystal pane 12, since the low refractive index layer 15 is provided between the sheet-shaped light guide 4 of the light source device 1 and the reflection type liquid crystal panel 12, when assuming that the refractive index of the sheet-shaped light guide 4 is taken as $n_1$, the refractive index of the substrate opposed to the emitting surface 4c of the light source device 1 in the reflection type liquid crystal panel 12 as $n_4$, and the refractive index of the low refractive index layer 15 as $n_3$, it is preferable to use the materials satisfying $n_3<n_1$, $n_3<n_4$.

In the above-described display device 11, the light emitted from the light source device 1 passes through the low refractive index layer 15 and the optical film layer 14, and is reflected in the reflecting pixel electrode formed in the substrate 12b of the reflection type liquid crystal panel 12. The light reflected in the reflecting pixel electrode subsequently passes through the low refractive index layer 15, the optical film layer 14 and the sheet-shaped light guide 4 of the optical sourcedevice 1 again and reaches the eye of the observer 16.

In the present embodiment, the sheet-shaped light guide 4 of the light source device 1 and the optical film layer 14 are adhered or stuck through the low refractive index layer 15, and therefore, a gap between the light source device 1 and the reflection type liquid crystal panel 12 is reduced. That is, in the case where the low refractive index layer 15 is not provided, an airspace of 1 to 2 mm is provided between the sheet-shaped light guide 4 and the optical film layer 14, while in the case where the low refractive index layer 15 is inserted, the thickness of the airspace becomes 50 to 100 μm, and therefore, the light source device can be made thin in size, and in addition, the display device 11 can be made,thin in size.

Further, since the light source device 1 is the same as the light source device according to the first embodiment, the intensity of distribution of the emitting light from the light source device 1 is uniform, and the optical utilization efficiency is high. Consequently, the display device 11 according to the present embodiment shown in FIG. 7 is high in the cognizability of the information (characters, images and the like) displayed in the reflection type liquid crystal panel 12, and the utilization efficiency of energy is high, and furthermore, it is of a thin type.

Incidentally, in the present embodiment, the display device 11 is not limited to the constitution adopting the same light source device as the first embodiment, and even when it is the same constitution adopting the same light source device as the second and third or the fourth embodiments, the same effect can be obtained.

Seventh Embodiment

Figure 9:
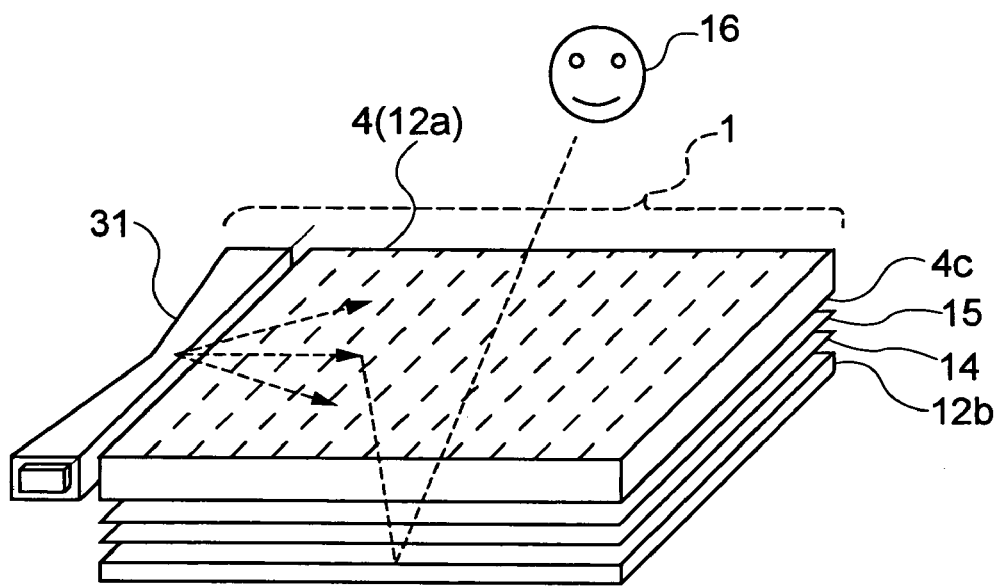
FIG. 9 is a view showing the constitution of the display device according to a seventh embodiment having preferably carried out the present invention.

A seventh embodiment having preferably carried out the present invention will be described. In FIG. 9 is shown a schematic oblique view of a display device 11 according to the present embodiment. The light source device 11 is a display device comprising the same light source device as that of the first embodiment as a front light.

As shown in FIG. 9, a sheet-shaped light guide 4 of a light source device 1 serves as a substrate 12a, which is opposed to an emitting surface 4c of the light source device 1 of a reflection type liquid crystal panel 12. Within the reflection type liquid crystal panel 12, there is provided an optical film layer 14. Further, between the optical film layer 14 and the sheet-shaped light guide 4, which serves as a substrate of the reflection type liquid crystal panel 12, there is provided a low refractive index layer 15, which allows the light guiding the sheet-shaped light guide 4 of the light source device 1 to be reflected in the emitting surface 4c of the sheet-shaped light guide 4.

The reflection type liquid crystal panel 12 is the same as that of the fifth embodiment.

The optical film layer 14 is provided in order to make it possible to recognize the information displayed in the reflection type liquid crystal panel 12 by the naked eye, and it is constituted by at least one from a polarizing layer for transmitting a specific polarizing component only and a phase difference layer for performing an optical compensation of a liquid crystal.

The low refractive index layer 15 preferably adopts a layer being low in an absorptivity of light. Further, when assuming that the refractive index of the sheet-shaped light guide 4 is taken as $n_1$, the refractive index of the optical film layer 14 as $n_2$, and the refractive index of the low refractive index layer as $n_3$, so that the light guiding the sheet-shaped light guide 4 of the light source device 1 is totally reflected on the emitting surface 4c of the sheet-shaped light guide 4, it is preferable to choose materials so as to satisfy $n_3<n_1$, $n_3<n_2$. As such resin, silicon system resin, fluorine system resin, acryl system resin and the like can be used.

In the above-described display device 11, the light emitted from the light source device 1 passes through the low refractive index layer 15 and the optical film layer 14, and is reflected in the reflecting pixel electrode formed in the substrate 12b of the reflection type liquid crystal panel 12. The light reflected in the reflecting pixel electrode subsequently passes through the low refractive index layer 15, the optical film layer 14 and the sheet-shaped light guide 4 of the optical source device 1 again and reaches the eye of an observer 16.

In the present embodiment, in the reflection type liquid crystal panel 12, since a substrate 12a opposed to the light emitting surface 4c of the light source device 1 serves as the sheet-shaped light guide 4 of the light source 1, the thickness of the display device 11 can be reduced so as to be thin in size.

Further, since the light source device 1 is the same as the light source device according to the first embodiment, the intensity of distribution of the emitted light from the light source device 1 is uniform, and the optical utilization efficiency is high. Hence, the display device 11 according to the present embodiment shown in FIG. 9 is high in the cognizability of the information (characters, images and the like) displayed on the reflection type liquid crystal panel 12, and the utilization efficiency of energy is high. Furthermore, it is thin in size.

Incidentally, the display device 11 is not limited to the constitution adopting the same light source device as that of the first embodiment, and even if it is the constitution adopting the same light source device as that of the second or third embodiments or the fourth embodiment, the same effect can be obtained.

Eighth Embodiment

In the above-described fifth to seventh embodiments, the display device adopting the light source device 1 as a front light has been described. The present invention can be executed as a display device 11 of the constitution using a light source device 1 as a back light.

Figure 10:
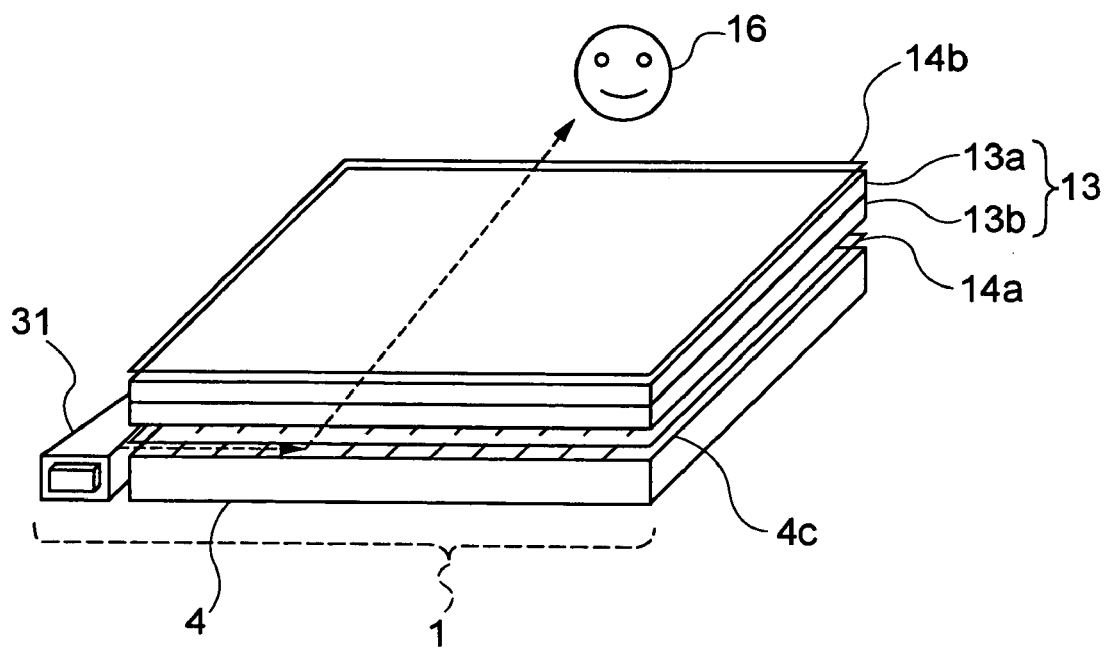
FIG. 10 is a view showing the constitution of the display device according to an eighth embodiment having preferably carried out the present invention.

In FIG. 10 is shown a schematic oblique view of a display device according to an eighth embodiment having preferably carried out the present invention. The display device 11 is a display device comprising a light source device 1 as a back light.

As shown in FIG. 10, in an emitting direction of an emitting surface 4c of a sheet-shaped light guide 4 equipped with the light source device 1, there is provided a transmission type liquid crystal panel 13. The transmission type liquid crystal panel 13 is adhered or stuck with optical film layers 14a and 14b.

The transmission type liquid crystal panel 13 comprises a first substrate 13a having a transparent electrode and being transparent itself, and a second substrate 13b provided with a switching element to drive a liquid crystal, and has a constitution in which the switching element and the transparent electrode of both these substrates are counter-disposed, and a liquid crystal is inserted there between. As for the transmission type liquid crystal panel 13, it is not limited to such an active matrix type, but the transmission type liquid crystal panel of a simple matrix type may be used. Further, the transmission type liquid crystal panel 13 may be a display device requiring other auxiliary light sources.

The optical film layers 14a and 14b are provided to make it possible to visually observe the information (characters, images and the like) displayed on the transmission type liquid crystal panel 13 by the naked eye, and are constituted by at least one from among a polarizing layer for transmitting a specific polarizing component and a phase difference layer for performing an optical compensation of a liquid crystal. The optical film layers 14a and 14b or a part of the optical film layers 14a and 14b may be provided in the interior of the transmission type liquid crystal panel 13.

In the display device 11 of the above-described constitution, the light emitted from the light source device 1 passes through the optical film layer 14a and is incident on the transmission type liquid crystal panel 13. The light incident on the transmission type liquid crystal panel 13 subsequently passes through the optical film layer 14b and reaches the eye of the observer 16.

In the above-described display device 11, since the light source device 1 is the same as the light source device according to the first embodiment, the intensity of distribution of the emitted light from the light source device 1 is uniform, and the optical utilization efficiency is high. Consequently, the display device 11 according to the present embodiment shown in FIG. 10 is high in the recognability of the information (characters, images and the like) displayed on the transmission type liquid crystal panel 12, and is high in the utilization efficiency of energy.

The display device 11 according to the present embodiment shown in FIG. 10 is not limited to the constitution adopted to the same light source device as that of the first embodiment, and even when it is a constitution adopting the same light source device as that of the second or third embodiments or the fourth embodiment, the same effect can be obtained.

Further, in the present embodiment, a low refractive index layer 15 is provided similarly with the six embodiment, so that the display device 11 can be made thin in size. Further, similarly with the seventh embodiment, in the transmission type liquid crystal panel 13, the sheet-shaped light guide 4 of the light source device 1 serves as the substrate opposed to the emitting surface 4c of the light source device 1, so that the display device can be made thinner in size.

Ninth Embodiment

Figure 11:
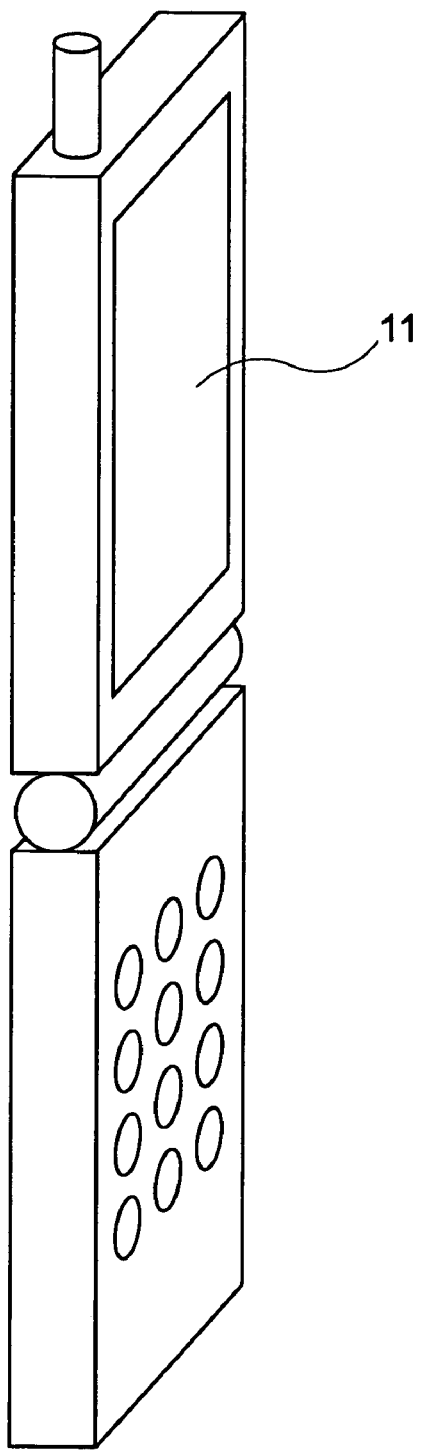
FIG. 11 is a view showing the constitution of the display device according to a ninth embodiment having preferably carried out the present invention.
Figure 12:
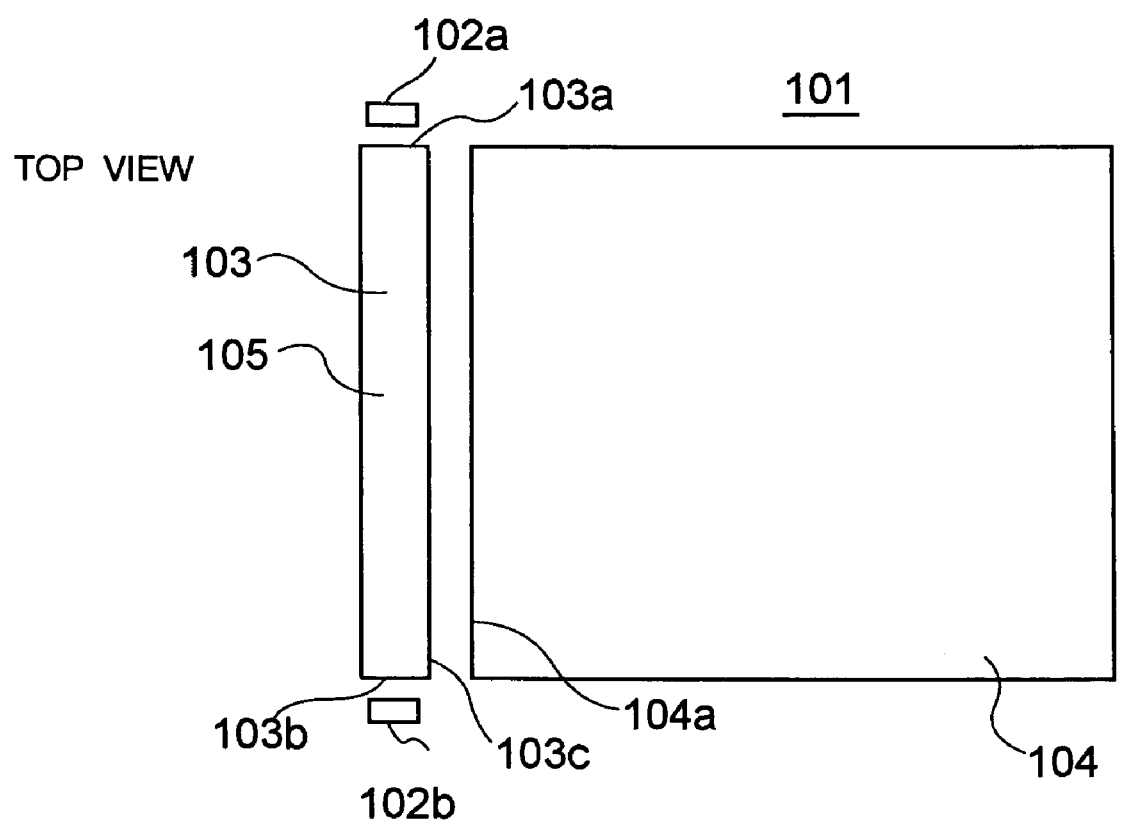
FIG. 12 is a view showing a constitutional example of a conventional light source device.
Figure 12:
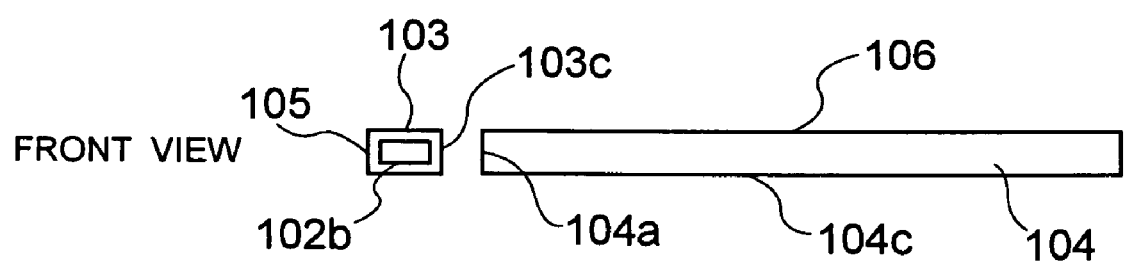
Figure 13:
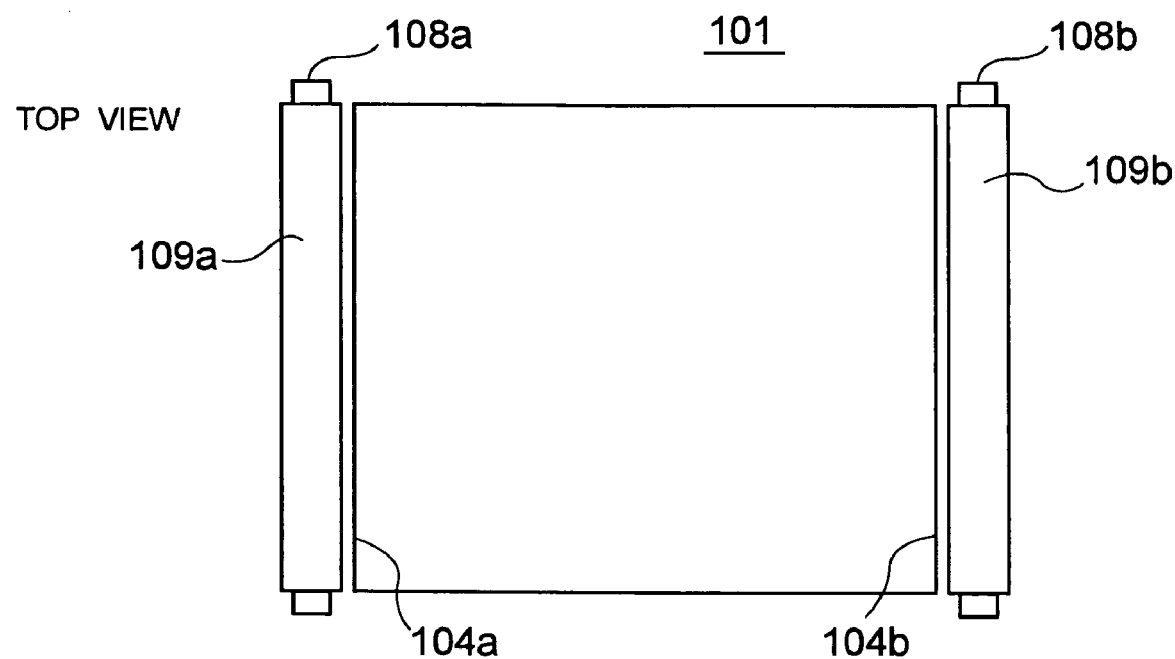
FIG. 13 is a view showing a constitutional example of a conventional light source device.
Figure 13:
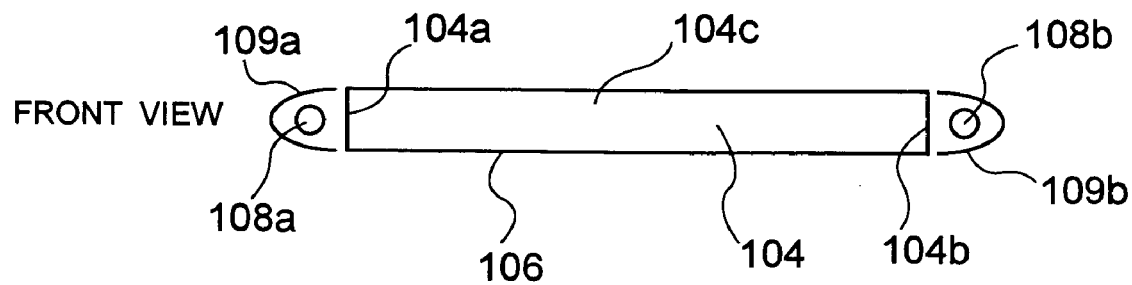
Figure 14A:
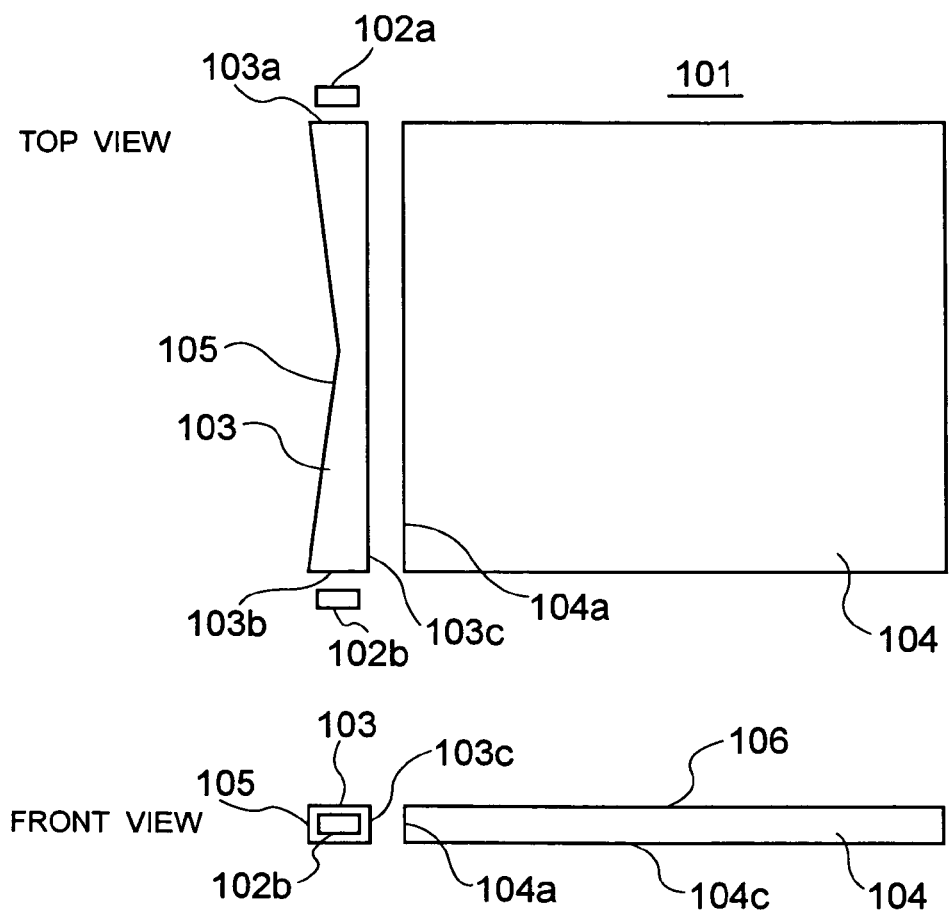
FIGS. 14A and 14B are views showing a constitutional example of a conventional light source device.
Figure 14B:
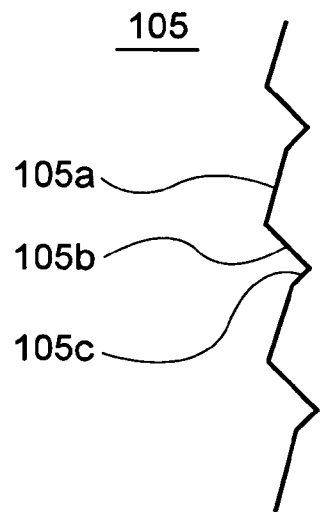

A ninth embodiment having preferably carried out the present invention will be described. In FIG. 11 is shown information terminal according to the present embodiment. The information terminal 21 comprises the same display device as that of the fifth embodiment. Incidentally, the information terminal 21 may be any device provided that it comprises the display device 11 for displaying visually cognizable information such as characters, images and the like. As an example of the information terminal 21, a portable telephone, an electronic notebook, a game machine and the like can be cited.

In the present embodiment, by using the display device 11 of the same constitution as that of the fifth embodiment, the information terminal 21 can be provided, which is high in the cognizability of the information displayed on the display device 11 and is little in energy consumption.

This effect is not only obtained in the case where the display device of the constitution comprising the light source device as a front light similarly with the fifth embodiment is adopted, but also the same effect is obtained similarly in the case where the display device of the constitution comprising the light source device 1 as a back light similarly with the eighth embodiment is adopted. Further, if the display device 11 of the information terminal 21 is allowed to have the same constitution as that of the six or seventh embodiments, the congizability of the information display on the display device 11 becomes high, and the utilization efficiency of energy is becomes high, and furthermore, a thin type information terminal 21 can be provided.

Incidentally, each of the above-described embodiments is one example of the preferred embodiments, and the present invention is not limited to these embodiments.

For example, in each of the above-described embodiments, through the light source device for use of the display device is described as an example, it can be executed as a general illumination (for example, an indoor illumination).

Further, the light source device is not limited to a device for illuminating an electronic display, but it can be adopted as a schaukasten for illuminating an x-ray picture, a light box for illuminating a negative film or tracing a manuscript, and further as a light source of an emergency illuminating lamp.

As evident from the above-described explanation, according to the present invention, a light guide, a light source device equipped with this light guide, a display device adopting this device, and an information terminal can be provided, which is high in the emitting efficiency and uniform in the intensity of distribution of the emitting light.

What is claimed is:

1. A light guide which receives an incident light from an incidence plane and emits the incident light from an emitting surface provided on a surface adjacent to the incidence plane, said light guide comprising:
    a total reflecting surface which guides the incident light within said light guide;
    a light extracting surface which reflects incident light toward said emitting surface where the incident light emits from said emitting surface;
    a re-incidence plane, which is formed so as to form a substantially V-shaped groove with said light extracting surface, and if not all of the incident light is reflected toward said emitting surface by said light extracting surface, said re-incidence plane receives incident light not reflected toward said emitting surface from said light extracting surface, and
    wherein said total reflecting surface, said light extracting surface, and said re-incidence plane are periodically formed on a surface opposite to said emitting surface,
    wherein a distance d defines a distance between a line through a vertex of said substantially V-shaped groove and parallel with said emitting surface and an intersection between said total reflecting surface adjacent to the substantially V-shaped groove and positioned at said incidence plane side and said light extracting surface,
    wherein a distance x defines a distance between the line through the vertex of said substantially V-shaped groove and parallel with said emitting surface and an intersection between said total reflecting surface adjacent to the substantially V-shaped groove and positioned at an opposite side of said incidence plane and said re-incidence plane, and
    wherein the surface opposite to said emitting surface has a region where $x/d<1$, and at least one of d and x is allowed to periodically change so that the intensity distribution of the light emitted from said emitting surface is uniform.

2. The light guide according to claim 1, wherein in the region of a surface opposed to said emitting surface where $x/d<1$, $x-d$ is constant, and d and x are changed so that the intensity distribution of the light emitted from said emitting surface is uniform.

3. The light guide according to claim 1, wherein in the region of a surface opposed to said emitting surface where $x/d<1$, $x/d$ is constant, and d and x are changed; so that the intensity of distribution of the light emitted from said emitting surface is made uniform.

4. The light guide according to claim 1, wherein said light guide is a linear light guide which receives the incident light emitted by a point light source from said incidence plane and emits the incident light from said emitting surface as a linear light.

5. The light guide according to claim 1, wherein said light guide is a sheet-shaped light guide which receives the incident light emitted by a line light source from said incidence plane and emits the incident light from said emitting surface as a sheet-shaped light.

6. A light source device comprising:
    the light guide according to claim 1; and,
    a light source providing the incident light,
    wherein the incident light is incident said to said incidence plane.

7. The light source device according to claim 6, further comprising a substantially sheet-shaped reflecting member which is adjacent to said total reflecting surface, said light extracting surface and said re-incidence plane, which reflects the incident light emitted outside of said light extracting surface causing said incident light emitted outside of said light extracting surface to be incident again to said total reflecting surface, said light extracting surface, and said re-incidence plane.

8. A display device, comprising:
    the light source device according to claim 6; and
    a display panel for displaying information which is illuminated by the light source device.

9. The display device according to claim 8, wherein the light incidence plane of said display panel and the emitting surface of said light guide are adhered to each other.

10. The display device according to claim 8, wherein said display panel is a layered structure comprising a plurality of platy members, and said light guide serves as the platy member by which said light guide allows the incident light to be incident on said display panel.

11. The light source device accordina to claim 8, wherein said display device is an information terminal.

* * * * *